(12) United States Patent
Hwang et al.

(10) Patent No.: US 11,153,818 B2
(45) Date of Patent: Oct. 19, 2021

(54) METHOD AND APPARATUS FOR INITIAL NEGOTIATION IN WIRELESS LAN

(71) Applicant: ELECTRONICS AND TELECOMMUNICATIONS RESEARCH INSTITUTE, Daejeon (KR)

(72) Inventors: Sung Hyun Hwang, Daejeon (KR); Igor Kim, Daejeon (KR); Seung Keun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/341,857

(22) PCT Filed: Oct. 12, 2017

(86) PCT No.: PCT/KR2017/011241
§ 371 (c)(1),
(2) Date: Apr. 12, 2019

(87) PCT Pub. No.: WO2018/070800
PCT Pub. Date: Apr. 19, 2018

(65) Prior Publication Data
US 2019/0327672 A1 Oct. 24, 2019

(30) Foreign Application Priority Data

Oct. 12, 2016 (KR) .................. 10-2016-0132189
Jan. 11, 2017 (KR) .................. 10-2017-0004129

(51) Int. Cl.
*H04W 52/04* (2009.01)
*H04W 52/02* (2009.01)
(Continued)

(52) U.S. Cl.
CPC ....... *H04W 52/0206* (2013.01); *H04L 5/0048* (2013.01); *H04L 41/0806* (2013.01);
(Continued)

(58) Field of Classification Search
CPC ......... H04L 5/007; H04L 27/02; H04L 27/18; H04L 27/2602; H04L 27/2605;
(Continued)

(56) References Cited

U.S. PATENT DOCUMENTS 9,191,890 B2 * 11/2015 Jafarian ............ H04W 52/0209
9,241,307 B2 * 1/2016 Merlin .............. H04W 52/0209
(Continued)

FOREIGN PATENT DOCUMENTS

EP 2996400 A1 3/2016
KR 20150074148 A 7/2015

OTHER PUBLICATIONS

"Wake-Up Latency Evaluation of IEEE 802.11ba WUR System"; Hwang et al.; 2018 International Conference on Information and Communication Technology Convergence (ICTC); Oct. 17, 2018 (Year: 2018).*
(Continued)

*Primary Examiner* — Benjamin H Elliott, IV

(57) ABSTRACT

Disclosed are a method and an apparatus for initial negotiation in a wireless LAN. An operating method of a station in a communication system comprises the steps of: generating a probe request frame including WUR capability information of the station which supports a WUR mode; transmitting the probe request frame; and receiving a probe response frame from an access point having received the probe request frame. Therefore, the performance of the communication system can be improved.

11 Claims, 48 Drawing Sheets

(51) Int. Cl.
*H04L 5/00* (2006.01)
*H04L 12/24* (2006.01)
*H04W 12/069* (2021.01)
*H04W 84/12* (2009.01)
*H04W 88/08* (2009.01)
*H04W 12/73* (2021.01)
*H04W 12/76* (2021.01)

(52) U.S. Cl.
CPC ......... *H04W 12/069* (2021.01); *H04L 5/0055* (2013.01); *H04W 12/73* (2021.01); *H04W 12/76* (2021.01); *H04W 84/12* (2013.01); *H04W 88/08* (2013.01)

(58) Field of Classification Search
CPC ............. H04L 27/2613; H04L 27/2675; H04L 5/0007; H04W 52/0229; H04W 28/065; H04W 84/12; H04W 80/02
See application file for complete search history.

(56) References Cited

U.S. PATENT DOCUMENTS

| | | | | |
|---|---|---|---|---|
| 9,485,733 | B1* | 11/2016 | Park | H04W 52/0235 |
| 9,749,958 | B1* | 8/2017 | Segev | H04W 52/0235 |
| 10,091,728 | B2* | 10/2018 | Yang | H04W 4/20 |
| 10,129,064 | B1* | 11/2018 | Lee | H04L 27/2627 |
| 10,341,149 | B2* | 7/2019 | Park | H04L 27/04 |
| 10,362,538 | B2* | 7/2019 | Gao | H04W 52/0229 |
| 2004/0224728 | A1* | 11/2004 | Dacosta | H04W 88/02 455/574 |
| 2014/0112226 | A1* | 4/2014 | Jafarian | H04W 52/0225 370/311 |
| 2014/0219149 | A1* | 8/2014 | Kim | H04W 52/0216 370/311 |
| 2015/0103714 | A1* | 4/2015 | Lee, II | H04L 1/0027 370/311 |
| 2015/0334650 | A1* | 11/2015 | Park | H04W 52/0209 370/311 |
| 2016/0077573 | A1* | 3/2016 | Lee | H04L 12/12 713/310 |
| 2016/0127995 | A1* | 5/2016 | Merlin | H04W 52/0209 370/311 |
| 2016/0374019 | A1* | 12/2016 | Park | H04W 8/24 |
| 2017/0094600 | A1* | 3/2017 | Min | H04W 76/27 |
| 2018/0019902 | A1* | 1/2018 | Suh | H04L 27/2602 |
| 2018/0020405 | A1* | 1/2018 | Huang | H04W 4/80 |
| 2018/0049131 | A1* | 2/2018 | Huang | H04W 52/0248 |
| 2018/0069683 | A1* | 3/2018 | Huang | H04L 5/0092 |
| 2018/0077641 | A1* | 3/2018 | Yang | H04L 69/22 |
| 2018/0084501 | A1* | 3/2018 | Mu | H04W 68/00 |
| 2018/0103431 | A1* | 4/2018 | Suh | H04W 52/0216 |
| 2018/0184378 | A1* | 6/2018 | Fang | H04L 5/0007 |
| 2018/0227070 | A1* | 8/2018 | Suh | H04J 13/004 |
| 2018/0343081 | A1* | 11/2018 | Lopez | H04L 5/0007 |
| 2018/0376370 | A1* | 12/2018 | Shellhammer | H04L 27/2602 |
| 2019/0036754 | A1* | 1/2019 | Lee | H04L 27/2627 |
| 2019/0045451 | A1* | 2/2019 | Huang | H04L 5/0053 |
| 2019/0082385 | A1* | 3/2019 | Shellhammer | H04W 52/0203 |
| 2019/0246356 | A1* | 8/2019 | Kim | H04W 52/0235 |
| 2019/0268192 | A1* | 8/2019 | Lim | H04L 5/0092 |
| 2019/0289547 | A1* | 9/2019 | Cao | H04B 7/0617 |
| 2019/0327672 | A1* | 10/2019 | Hwang | H04L 41/0806 |
| 2020/0029276 | A1* | 1/2020 | Kim | H04W 52/0206 |

OTHER PUBLICATIONS

Minyoung Park; "Low-Power Wake-up Receiver Follow-Up"; 2016; 11 pages.

Frank Hsu; "LP WUR Wake-up Packet Identity Considerations"; 2016; 11 pages.

International Search Report; PCT/KR2017/011241; dated Feb. 5, 2018.

* cited by examiner

[FIG. 1]
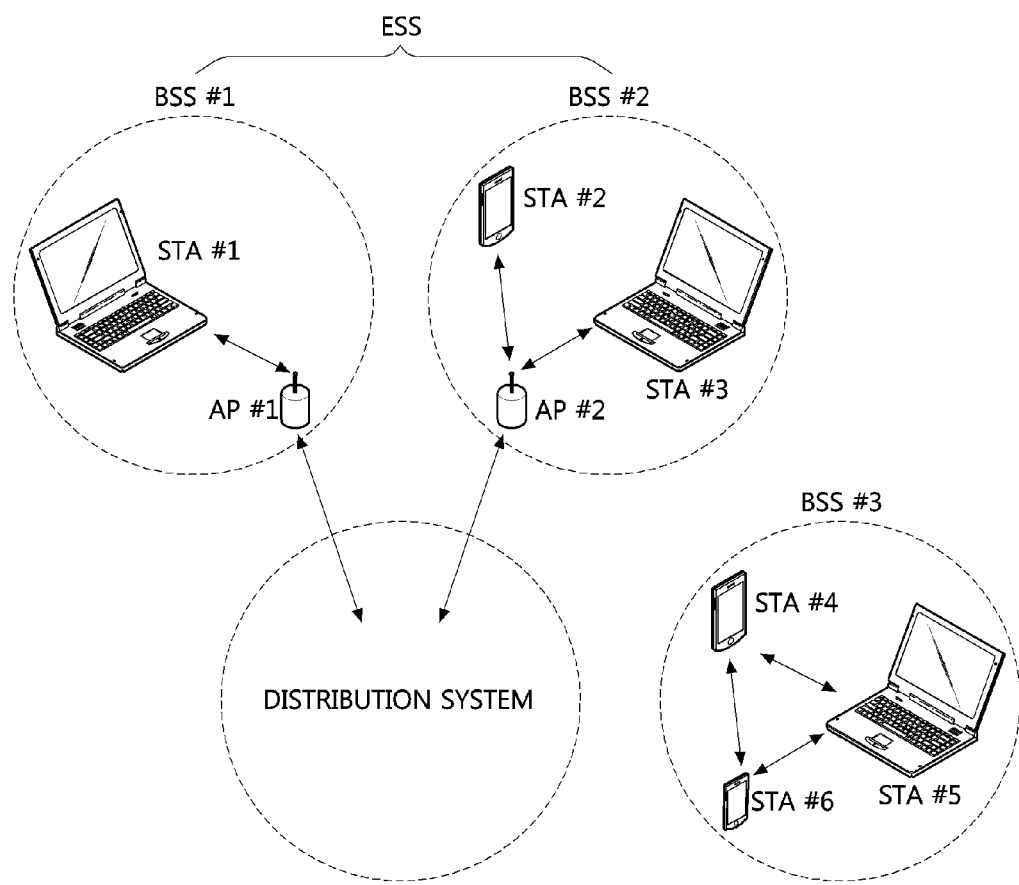

[FIG. 2]
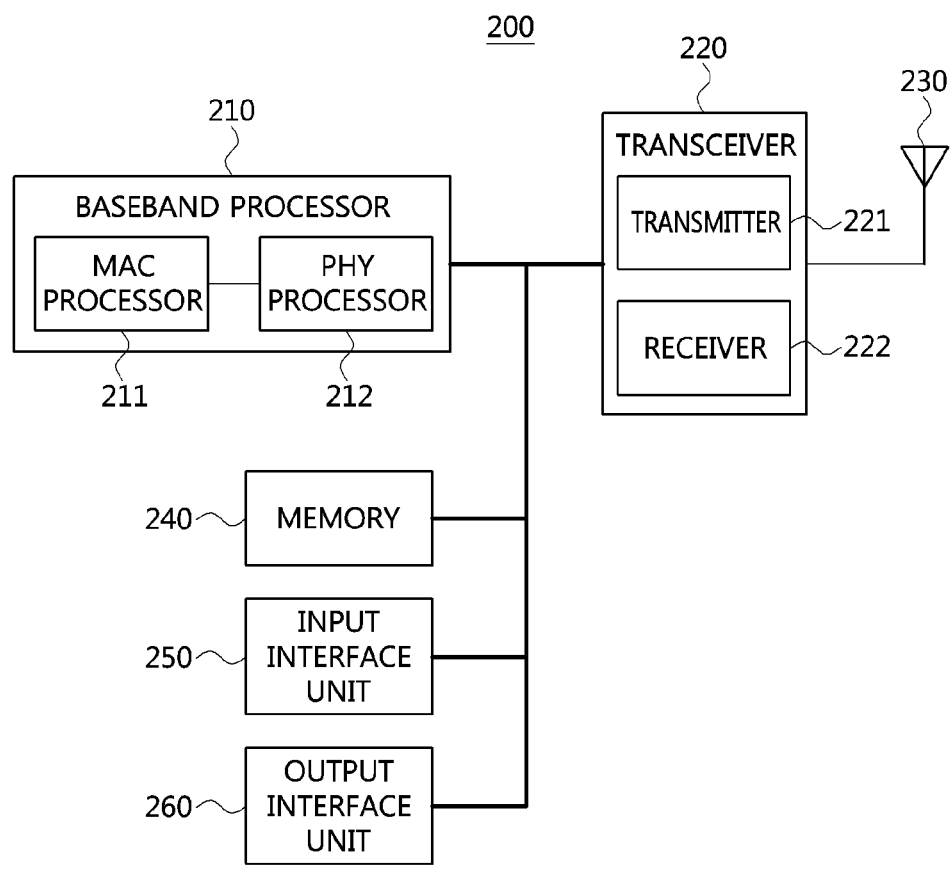

[FIG. 3]
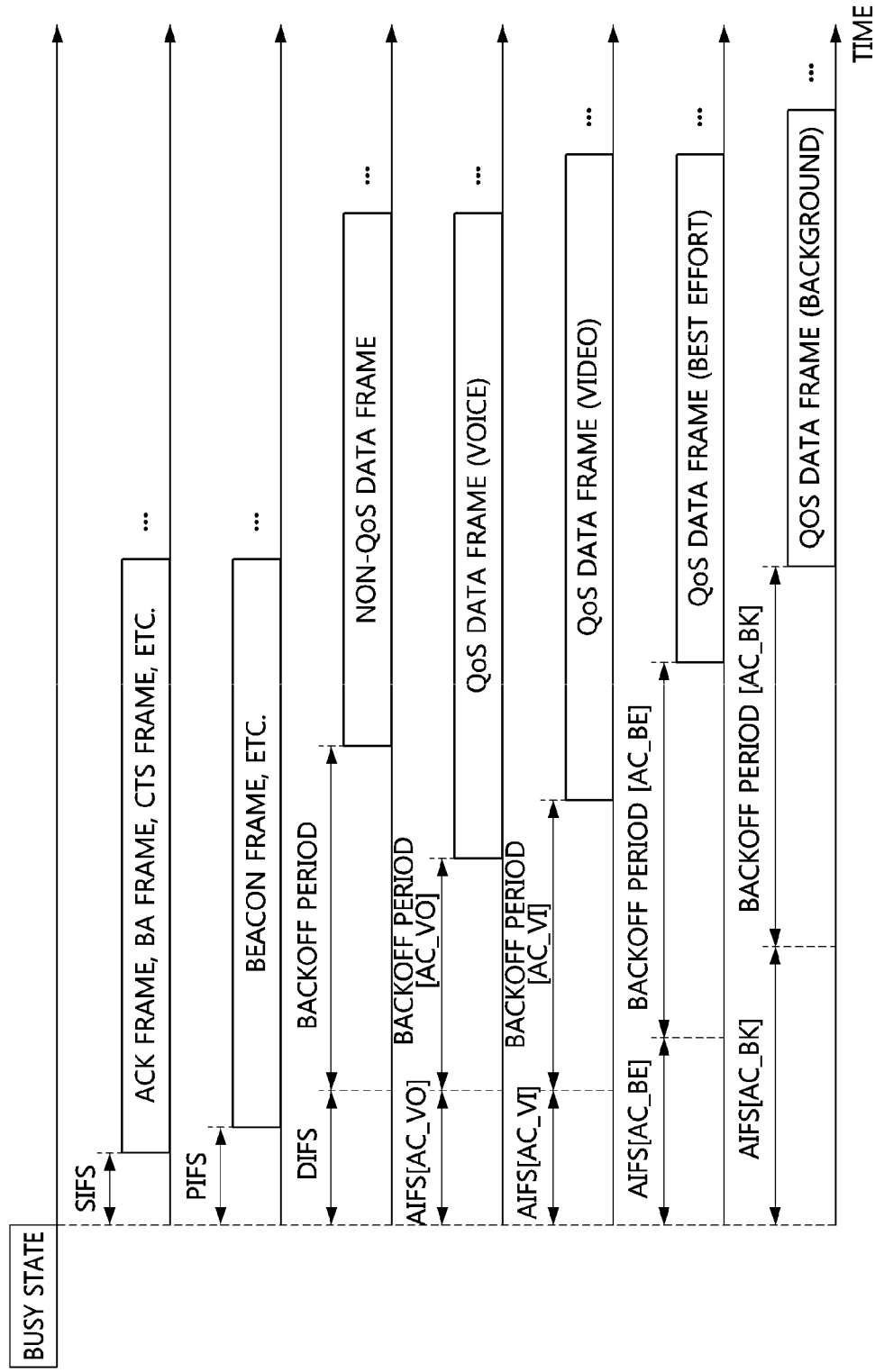

[FIG. 4]
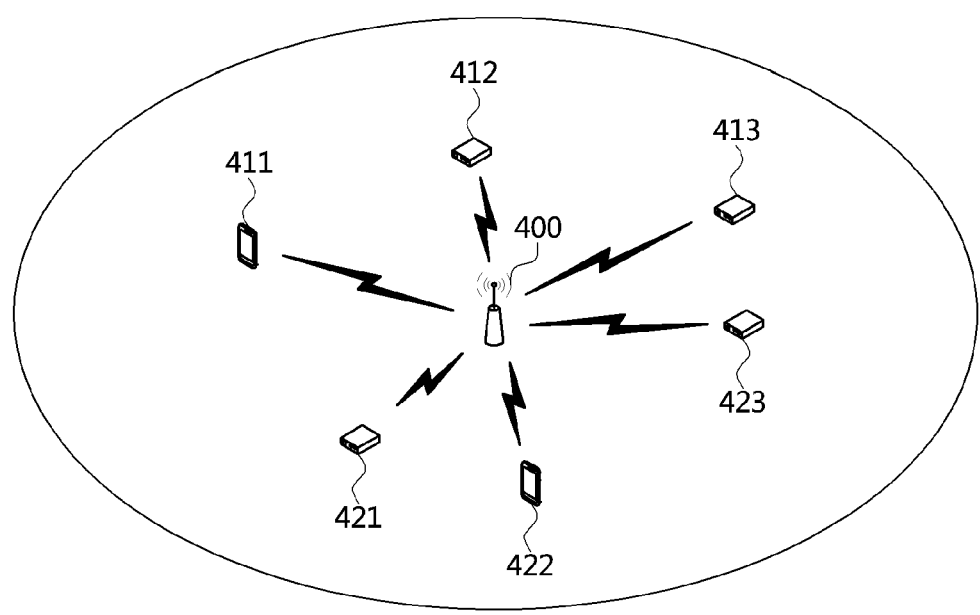

[FIG. 5]
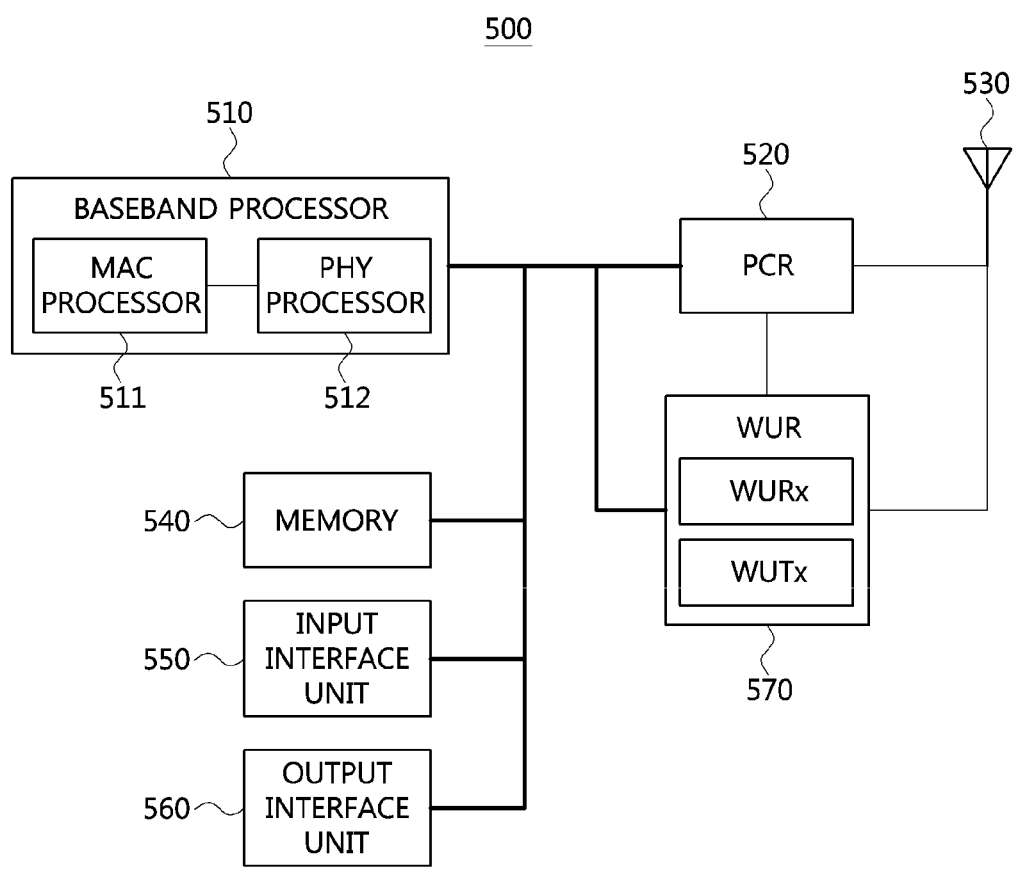

[FIG. 6]
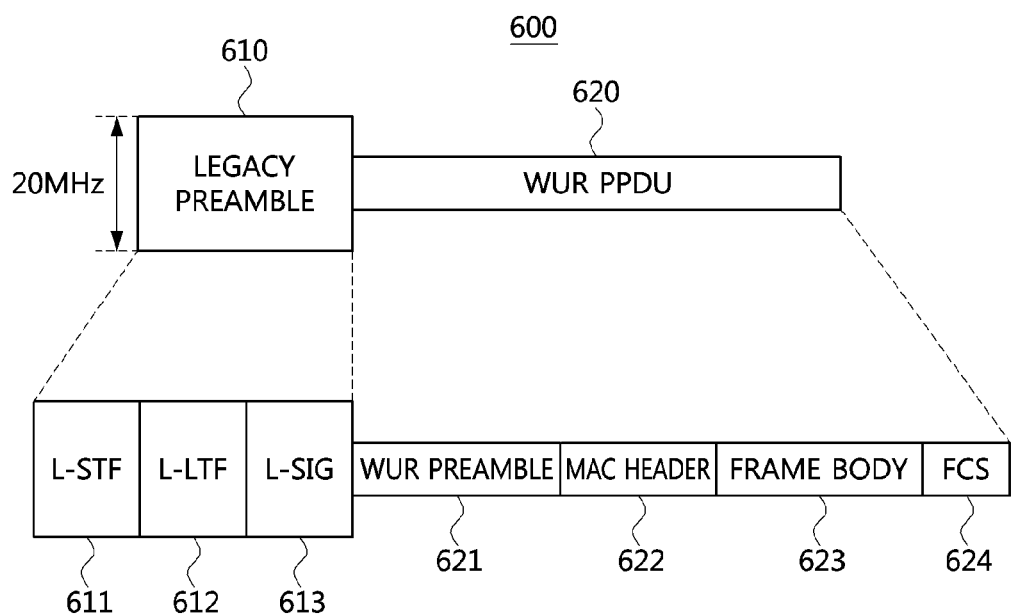

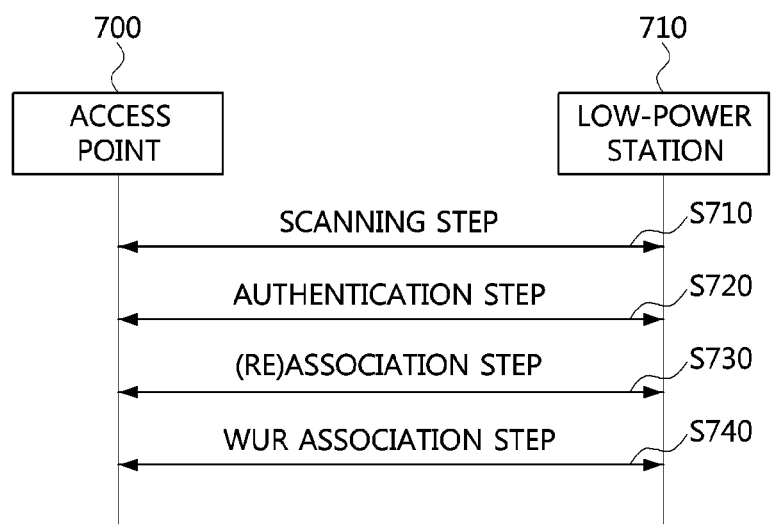
[FIG. 7]

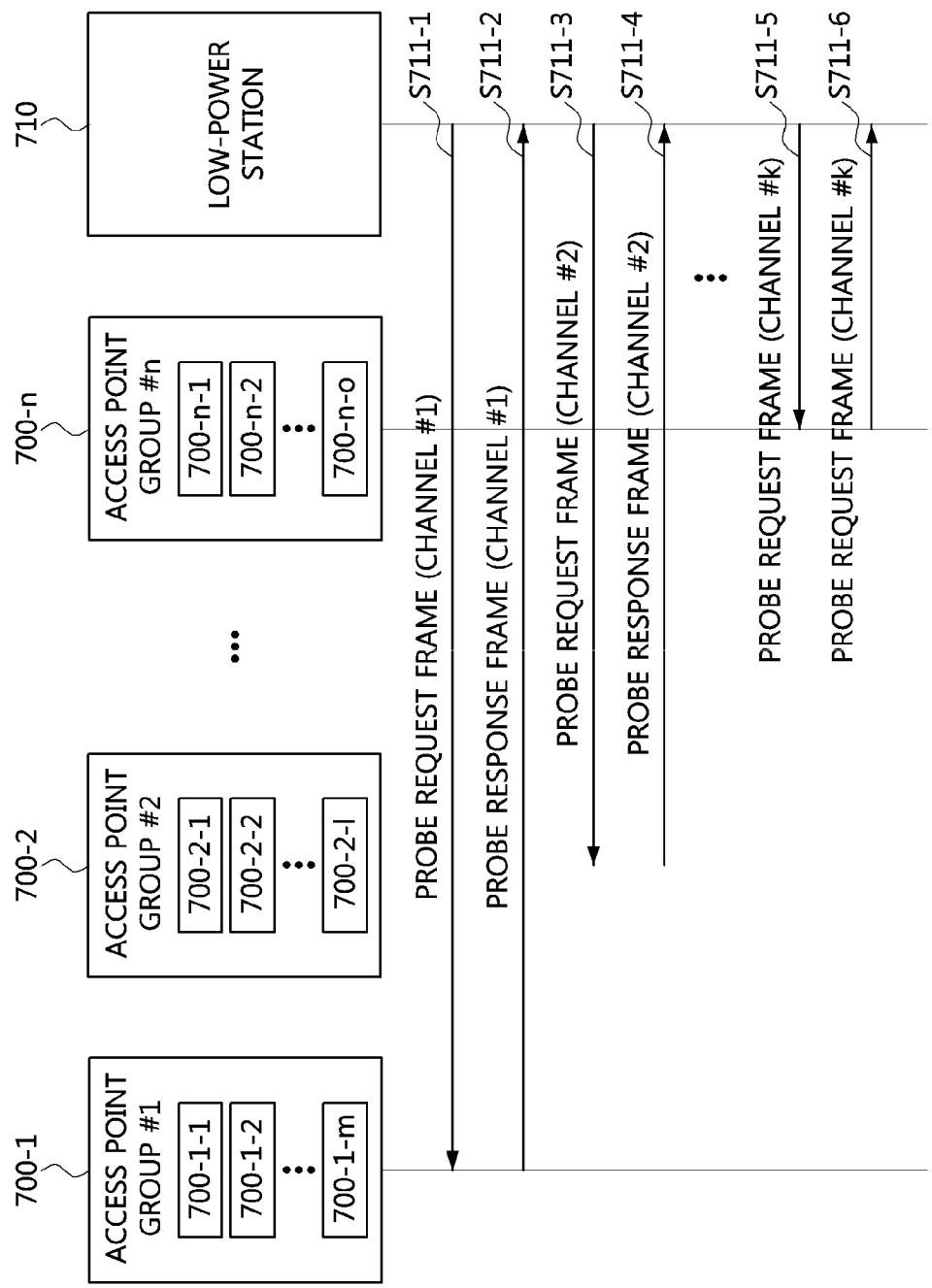
[FIG. 8]

[FIG. 9]
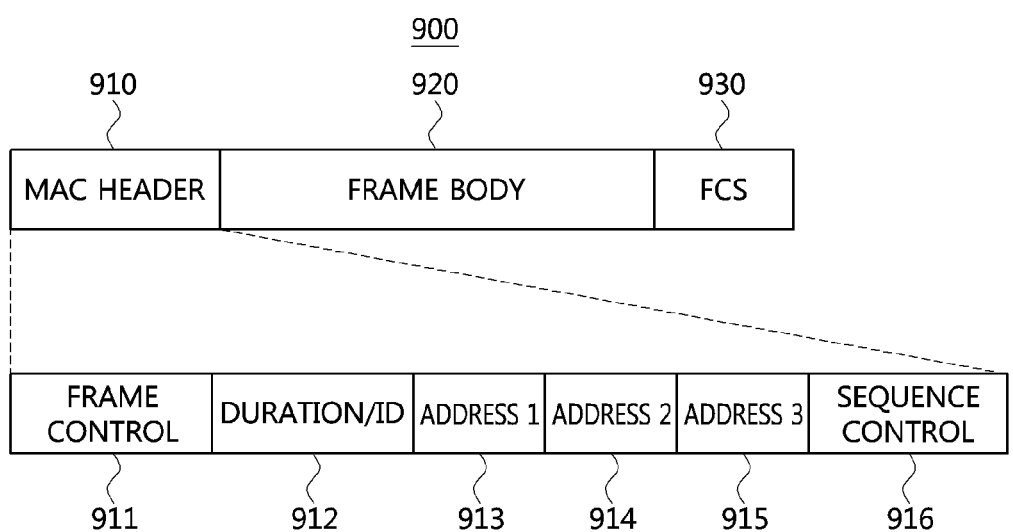

[FIG. 10]

| ID | Information Element | Length (Octets) | Extensible |
|---|---|---|---|
| 0 | SSID(service set identifier) | 2 to 34 | |
| 1 | Supported rates | 3 to 10 | |
| 2 | FH(frequency hopping) parameter set | 7 | |
| 3 | DSSS(direct sequence spread spectrum) parameter set | 3 | |
| 4 | CF(contention-free) parameter set | 8 | |
| 5 | TIM(traffic indication map) | 6 to 256 | |
| 6 | IBSS(independent BSS) parameter set | 4 | |
| 7 | Country | 8 to 256 | |
| 8 | Hopping pattern parameters | 4 | |
| 9 | Hopping pattern table | 6 to 256 | |
| 10 | Request | 2 to 256 | |
| 11 | BSS Load | 7 | |
| 12 | EDCA parameter set | 20 | |
| 13 | TSPEC(traffic specification) | 57 | |
| 14 | TCLASS | 2 to 257 | |
| 15 | Schedule | 16 | |
| 16 | Challenge text | 3 to 255 | |
| 17-31 | Reserved | | |
| 32 | Power constraint | 3 | |
| 33 | Power capability | 4 | |
| 34 | TPC(transmit power control) request | 2 | |
| 35 | TPC report | 4 | |
| 36 | Supported channels | 4 to 256 | |

[FIG. 11]

| ID | Information Element | Length (Octets) | Extensible |
|---|---|---|---|
| 37 | Channel switch announcement | 5 | |
| 38 | Measurement request | 5 to 257 | sub-elements |
| 39 | Measurement report | 5 to 257 | sub-elements |
| 40 | Quiet | 8 | |
| 41 | IBSS DFS(dynamic frequency selection) | 10 to 255 | |
| 42 | ERP(extended rate PHY) | 3 | |
| 43 | TS(traffic stream) Delay | 6 | |
| 44 | TCLAS(traffic classification) processing | 3 | |
| 45 | HT(high throughput) capabilities | 28 | Yes |
| 46 | QoS(quality of service) capability | 3 | |
| 47 | Reserved | | |
| 48 | RSN(robust security network) | 36 to 256 | |
| 49 | Reserved | | |
| 50 | Extended supported rates | 3 to 257 | |
| 51 | AP channel report | | |
| 52 | Neighbor report | | sub-elements |
| 53 | RCPI(received channel power indicator) | | Yes |
| 54 | MDE(mobility domain) | | |
| 55 | FTE(fast BSS transition) | | |
| 56 | Timeout interval | | |
| 57 | RDE(RIC(resource information container) data) | | |
| 58 | DSE(dynamic STA enablement) registered location | | |
| 59 | Supported operating classes | | |

[FIG. 12]

| ID | Information Element | Length (Octets) | Extensible |
|---|---|---|---|
| 60 | Extended channel switch announcement | 6 | |
| 61 | HT operation | 24 | Yes |
| 62 | Secondary channel offset | 3 | |
| 63 | BSS average access delay | 3 | Yes |
| 64 | Antenna | 3 | Yes |
| 65 | RSNI(robust security network association) | 3 | Yes |
| 66 | Measurement pilot transmission | 3 to 257 | sub-elements |
| 67 | BSS available admission capacity | 4 to 28 | Yes |
| 68 | BSS AC(access category) access delay | 6 | Yes |
| 69 | Time advertisement | 3 to 18 | Yes |
| 70 | RM(radio measurement) Enabled Capabilities | 7 | Yes |
| 71 | Multiple BSSID | 3 to 257 | sub-elements |
| 72 | 20/40 BSS coexistence | 3 | Yes |
| 73 | 20/40 BSS intolerant channel report | 3 to 257 | |
| 74 | Overlapping BSS scan parameters | 16 | |
| 75 | RIC descriptor | 3 to 257 | |
| 76 | Management MIC(message integrity code) | 18 | |
| 78 | Event request | 5 to 257 | sub-elements |
| 79 | Event report | 5 to 257 | |
| 80 | Diagnostic request | 6 to 257 | sub-elements |
| 81 | Diagnostic report | 5 to 257 | sub-elements |
| 82 | Location parameters | 2 to 257 | sub-elements |
| 83 | Nontransmitted BSSID capability | 4 | |

[FIG. 13]

| ID | Information Element | Length (Octets) | Extensible |
|---|---|---|---|
| 84 | SSID list | 2 to 257 | |
| 85 | Multiple BSSID-index | 3 to 5 | |
| 86 | FMS(flexible multicast service) descriptor | 3 to 257 | |
| 87 | FMS request | 3 to 257 | sub-elements |
| 88 | FMS response | 18 to 257 | sub-elements |
| 89 | QoS traffic capability | 3 to 5 | Yes |
| 90 | BSS max idle period | 5 | Yes |
| 91 | TFS request | 6 to 257 | sub-elements |
| 92 | TFS response | 6 to 256 | sub-elements |
| 93 | WNM(wireless network management)-sleep mode | 6 | Yes |
| 94 | TIM broadcast request | 3 | Yes |
| 95 | TIM broadcast response | 3 or 12 | Yes |
| 96 | Collocated interference report | 23 | Yes |
| 97 | Channel usage | 3 to 257 | sub-elements |
| 98 | Time zone | 3 to 257 | Yes |
| 99 | DMS(direct multicast service) request | 3 to 257 | sub-elements |
| 100 | DMS response | 3 to 257 | sub-elements |
| 101 | Link identifier | 20 | Yes |
| 102 | Wakeup schedule | 20 | Yes |
| 104 | Channel switch timing | 6 | Yes |
| 105 | PTI control | 5 | Yes |
| 106 | TPU buffer status | 3 | Yes |
| 107 | Interworking | 3, 5, 9, 11 | |

[FIG. 14]

| ID | Information Element | Length (Octets) | Extensible |
|---|---|---|---|
| 108 | Advertisement protocol | variable | |
| 109 | Expedited bandwidth request | 3 | |
| 110 | QoS map set | 18 to 60 | Yes |
| 111 | Roaming consortium | variable | Yes |
| 112 | Emergency alert identifier | 10 | |
| 113 | Mesh configuration | 9 | Yes |
| 114 | Mesh ID | 2 to 34 | |
| 115 | Mesh link metric report | 3 to 257 | |
| 116 | Congestion notification | 16 | Yes |
| 117 | Mesh peering management | 5, 7, 9, 21, 23, or 25 | Yes |
| 118 | Mesh channel switch parameters | 8 | Yes |
| 119 | Mesh awake window | 4 | Yes |
| 120 | Beacon timing | 3 to 255 | |
| 121 | MCCAOP(MCCA TXOP) setup request | 8 | Yes |
| 122 | MCCAOP setup reply | 4 or 9 | |
| 123 | MCCAOP advertisement | 4 to 257 | Yes |
| 124 | MCCAOP teardown | 3 or 9 | Yes |
| 125 | GANN | 17 | Yes |
| 126 | RANN | 23 | Yes |
| 127 | Extended capabilities | 3 to 8 | Yes |
| 128 – 129 | Reserved | | |
| 130 | PREQ | 39 to 254 | Yes |
| 131 | PREP | 33 to 39 | Yes |

[FIG. 15]

| ID | Information Element | Length (Octets) | Extensible |
|---|---|---|---|
| 132 | PERR | 17 to 251 | Yes |
| 133 – 136 | Reserved | | |
| 137 | PXU | 21 to 257 | Yes |
| 138 | PXUC | 9 | Yes |
| 139 | Authenticated mesh peering exchange | 86 to 257 | |
| 140 | MIC | 18 | |
| 141 | Destination URI | 3 to 257 | Yes |
| 142 | U-APSD coexistence | 14 to 257 | sub-elements |
| 143 – 173 | Reserved | | |
| 174 | MCCAOP advertisement overview | 8 | Yes |
| 175 – 220 | Reserved | | |
| 221 | Vendor specific | 3 to 257 | |
| 222 | WUR capability | | |
| 223 | WUR support channel | | |
| 224 – 255 | Reserved | | |

[FIG. 16]
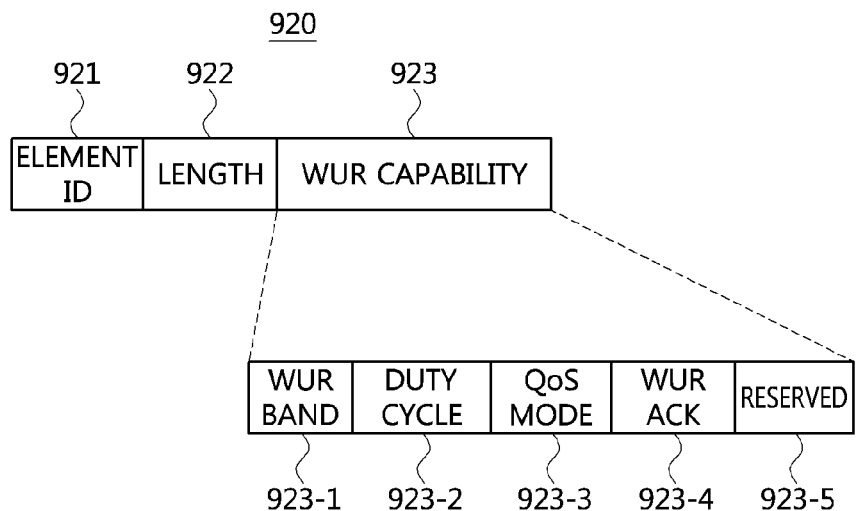
[FIG. 17]
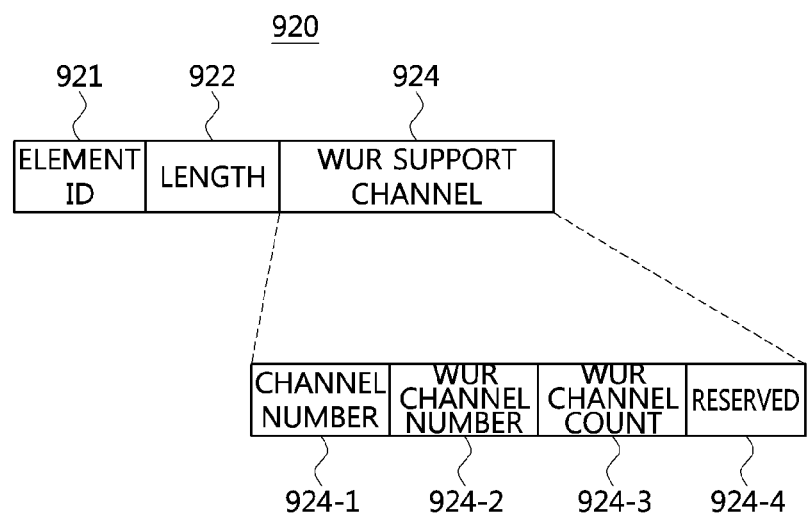

[FIG. 18]
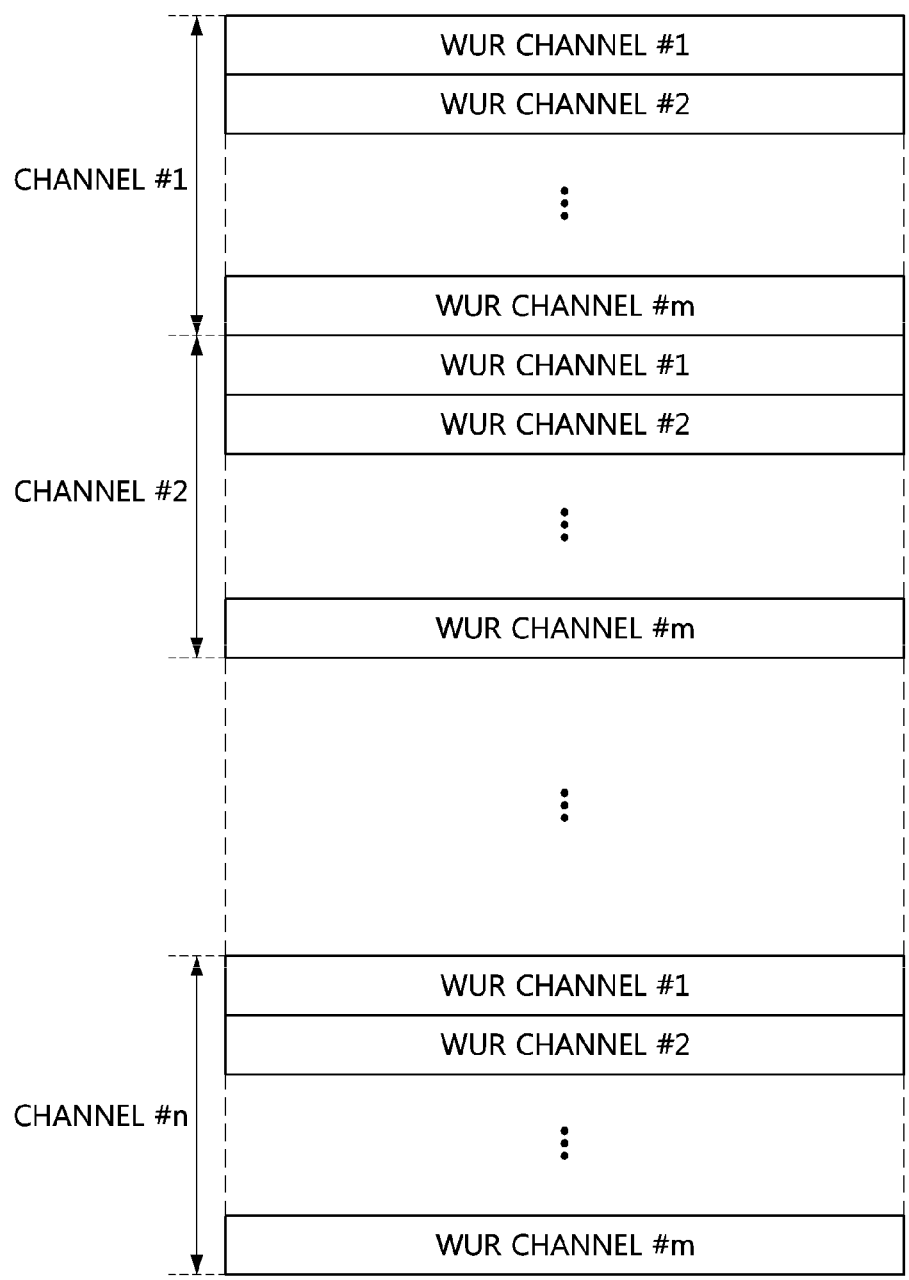

[FIG. 19]

| Index | Information Element |
|---|---|
| 1 | SSID |
| 2 | Supported rates |
| 3 | Request information |
| 4 | Extended supported rates |
| 5 | DSSS parameter set |
| 6 | Supported operating classes |
| 7 | HT capabilities |
| 8 | 20/40 BSS coexistence |
| 9 | Extended capabilities |
| 10 | SSID List |
| 11 | Channel usage |
| 12 | Interworking |
| 13 | Mesh ID |
| 14 | WUR capability |
| 15 | WUR support channel |
| 16 (last) | Vendor specific |

[FIG. 20]

| Index | Information Element |
|---|---|
| 1 | Timestamp |
| 2 | Beacon interval |
| 3 | Capability |
| 4 | SSID |
| 5 | Supported rates |
| 6 | FH parameter set |
| 7 | DSSS parameter set |
| 8 | CF parameter set |
| 9 | IBSS parameter set |
| 10 | Country |
| 11 | FH parameters |
| 12 | FH pattern table |
| 13 | Power constraint |
| 14 | Channel switch announcement |
| 15 | Quiet |
| 16 | IBSS DFS |
| 17 | TPC report |
| 18 | ERP |
| 19 | Extended supported rates |
| 20 | RSN |

[FIG. 21]

| Index | Information Element |
|---|---|
| 21 | BSS load |
| 22 | EDCA parameter set |
| 23 | Measurement pilot transmission |
| 24 | Multiple BSSID |
| 25 | RM enabled capabilities |
| 26 | AP channel report |
| 27 | BSS average access delay |
| 28 | Antenna |
| 29 | BSS available admission capacity |
| 30 | BSS AC access delay |
| 31 | Mobility domain |
| 32 | DSE registered location |
| 33 | Extended channel switch announcement |
| 34 | Supported operating classes |
| 35 | HT capabilities |
| 36 | HT operation |
| 37 | 20/40 BSS coexistence |
| 38 | Overlapping BSS scan parameters |
| 39 | Extended capabilities |
| 40 | QoS traffic capability |

[FIG. 22]

| Index | Information Element |
|---|---|
| 41 | Channel usage |
| 42 | Time advertisement |
| 43 | Time zone |
| 44 | Interworking |
| 45 | Advertisement protocol |
| 46 | Roaming consortium |
| 47 | Emergency alert identifier |
| 48 | Mesh ID |
| 49 | Mesh configuration |
| 50 | Mesh awake window |
| 51 | Beacon timing |
| 52 | MCCAOP advertisement overview |
| 53 | MCCAOP advertisement |
| 54 | Mesh channel switch parameters |
| 55 | WUR capability |
| 56 | WUR support channel |
| 57 (last-1) | Vendor specific |
| 58 (last) | Requested elements |

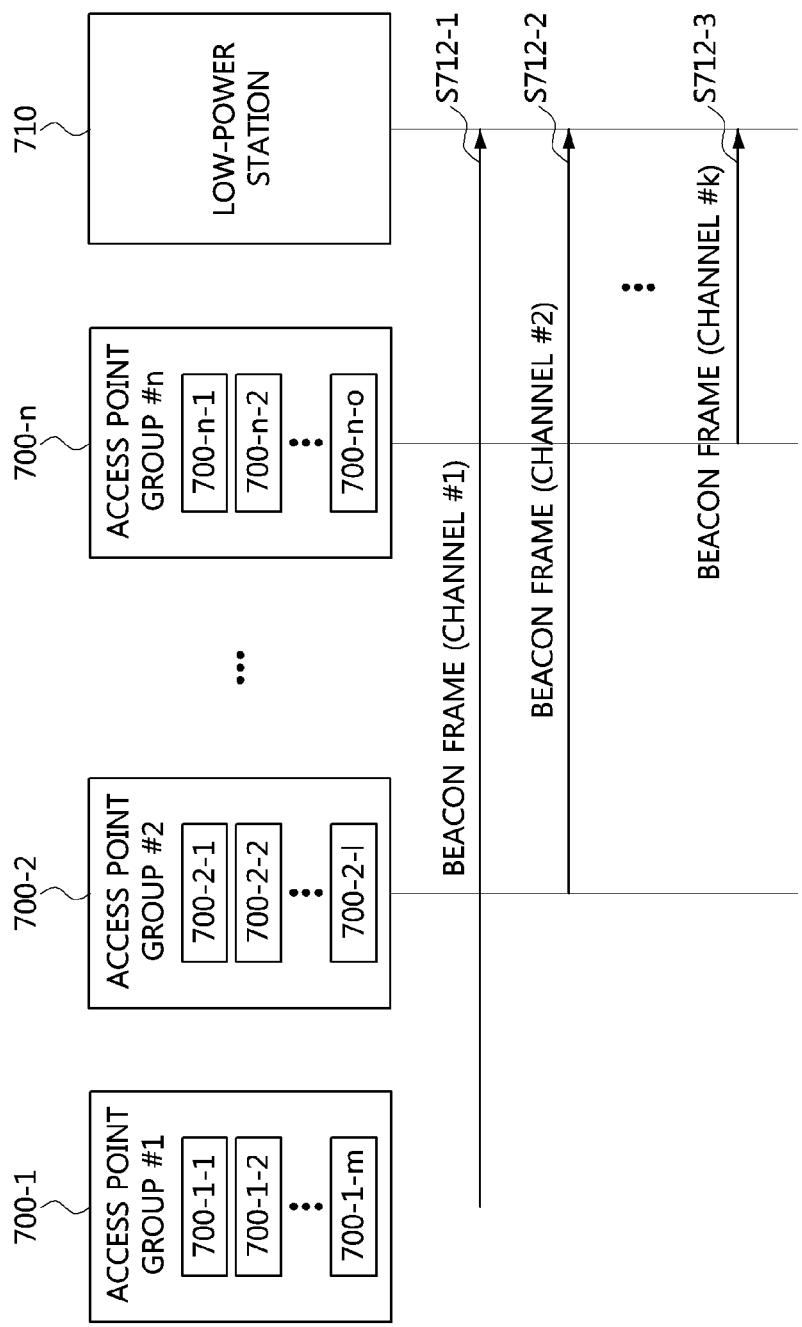
[FIG. 23]

[FIG. 24]

| Index | Information Element |
|---|---|
| 1 | Timestamp |
| 2 | Beacon interval |
| 3 | Capability |
| 4 | SSID |
| 5 | Supported rates |
| 6 | FH parameter set |
| 7 | DSSS parameter set |
| 8 | CF parameter set |
| 9 | IBSS parameter set |
| 10 | TIM |
| 11 | Country |
| 12 | FH parameters |
| 13 | FH pattern table |
| 14 | Power constraint |
| 15 | Channel switch announcement |
| 16 | Quiet |
| 17 | IBSS DFS |
| 18 | TPC report |
| 19 | ERP |
| 20 | Extended supported rates |

[FIG. 25]

| Index | Information Element |
|---|---|
| 21 | RSN |
| 22 | BSS load |
| 23 | EDCA parameter set |
| 24 | QoS capability |
| 25 | AP channel report |
| 26 | BSS average access delay |
| 27 | Antenna |
| 28 | BSS available admission capacity |
| 29 | BSS AC access delay |
| 30 | Measurement pilot transmission |
| 31 | Multiple BSSID |
| 32 | RM enabled capabilities |
| 33 | Mobility domain |
| 34 | DSE registered location |
| 35 | Extended channel switch announcement |
| 36 | Supported operating classes |
| 37 | HT capabilities |
| 38 | HT operation |
| 39 | 20/40 BSS coexistence |
| 40 | Overlapping BSS scan parameters |

[FIG. 26]

| Index | Information Element |
|---|---|
| 41 | Extended capabilities |
| 42 | FMS descriptor |
| 43 | QoS traffic capability |
| 44 | Time advertisement |
| 45 | Interworking |
| 46 | Advertisement protocol |
| 47 | Roaming consortium |
| 48 | Emergency alert identifier |
| 49 | Mesh ID |
| 50 | Mesh configuration |
| 51 | Mesh awake window |
| 52 | Beacon timing |
| 53 | MCCAOP advertisement overview |
| 54 | MCCAOP advertisement |
| 55 | Mesh channel switch parameters |
| 56 | WUR capability |
| 57 | WUR support channel |
| 58 (last) | Vendor specific |

[FIG. 27]
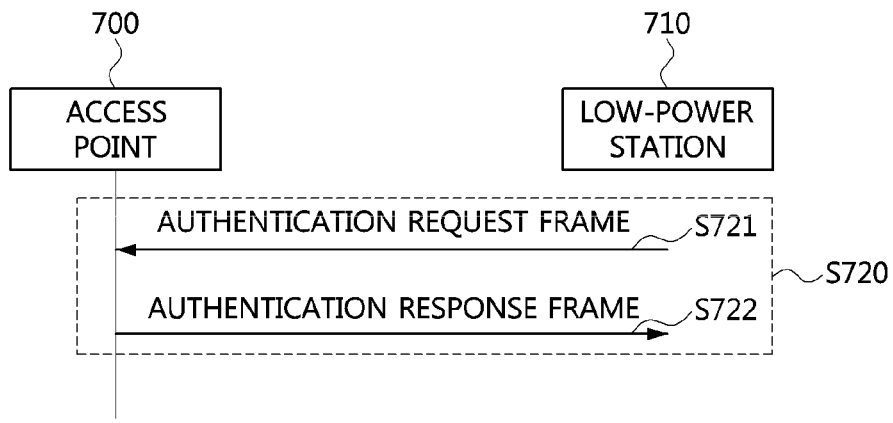
[FIG. 28]
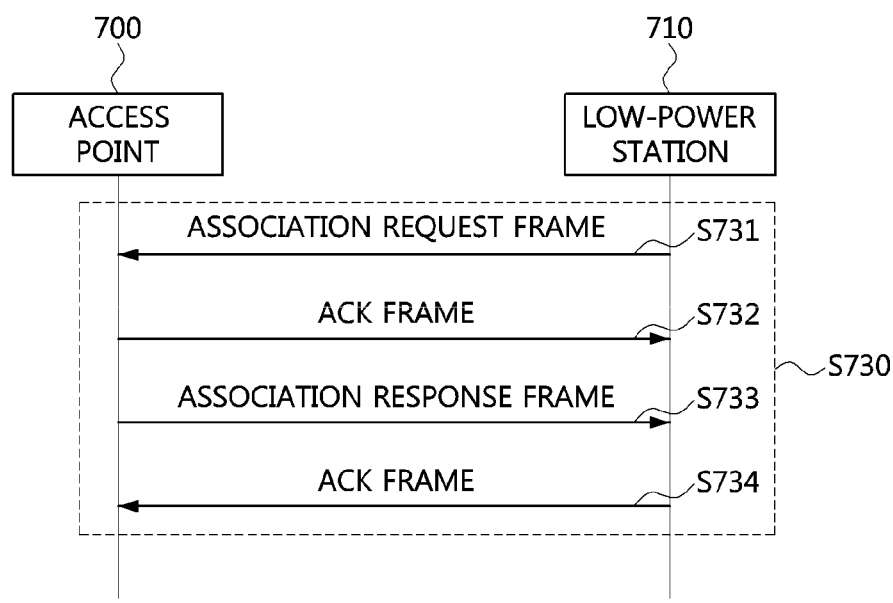

[FIG. 29]

| Index | Information Element |
|---|---|
| 1 | Capability |
| 2 | Listen interval |
| 3 | SSID |
| 4 | Supported rates |
| 5 | Extended supported rates |
| 6 | Power capability |
| 7 | Supported channels |
| 8 | RSN |
| 9 | QoS capability |
| 10 | RM enabled capabilities |
| 11 | Mobility domain |
| 12 | Supported operating classes |
| 13 | HT capabilities |
| 14 | 20/40 BSS coexistence |
| 15 | Extended capabilities |
| 16 | QoS traffic capability |
| 17 | TIM broadcast request |
| 18 | Interworking |
| 19 | WUR capability |
| 20 | WUR support channel |
| 21 (last) | Vendor specific |

[FIG. 30]

| Index | Information Element |
|---|---|
| 1 | Capability |
| 2 | Status code |
| 3 | AID |
| 4 | Supported rates |
| 5 | Extended supported rates |
| 6 | EDCA parameter set |
| 7 | RCPI |
| 8 | RSNI |
| 9 | RM enabled capabilities |
| 10 | Mobility domain |
| 11 | Fast BSS transition |
| 12 | DSE registered location |
| 13 | Timeout interval (Association comeback time) |
| 14 | HT capabilities |
| 15 | HT operation |
| 16 | 20/40 BSS coexistence |
| 17 | Overlapping BSS scan parameters |
| 18 | Extended capabilities |
| 19 | BSS Max idle period |
| 20 | TIM broadcast response |
| 21 | QoS map |
| 22 | WUR capability |
| 23 | WUR support channel |
| 24 (last) | Vendor specific |

[FIG. 31]

| Index | Information Element |
|---|---|
| 1 | Capability |
| 2 | Listen interval |
| 3 | Current AP address |
| 4 | SSID |
| 5 | Supported rates |
| 6 | Extended supported rates |
| 7 | Power capability |
| 8 | Supported channels |
| 9 | RSN |
| 10 | QoS capability |
| 11 | RM enabled capabilities |
| 12 | Mobility domain |
| 13 | Fast BSS transition |
| 14 | RIC(Resource information container) |
| 15 | Supported operating classes |
| 16 | HT capabilities |
| 17 | 20/40 BSS coexistence |
| 18 | Extended capabilities |
| 19 | QoS traffic capability |
| 20 | TIM broadcast request |
| 21 | FMS request |
| 22 | DMS request |
| 23 | Interworking |
| 24 | WUR capability |
| 25 | WUR support channel |
| 26 (last) | Vendor specific |

[FIG. 32]

| Index | Information Element |
|:---:|:---:|
| 1 | Capability |
| 2 | Status code |
| 3 | AID |
| 4 | Supported rates |
| 5 | Extended supported rates |
| 6 | EDCA parameter set |
| 7 | RCPI |
| 8 | RSNI |
| 9 | RM enabled capabilities |
| 10 | RSN |
| 11 | Mobility domain |
| 12 | Fast BSS transition |
| 13 | RIC |
| 14 | DSE registered location |
| 15 | Timeout Interval(Association comeback time) |

[FIG. 33]

| Index | Information Element |
|---|---|
| 16 | HT capabilities |
| 17 | HT operation |
| 18 | 20/40 BSS coexistence |
| 19 | Overlapping BSS scan parameters |
| 20 | Extended capabilities |
| 21 | BSS max idle period |
| 22 | TIM broadcast response |
| 23 | FMS response |
| 24 | DMS response |
| 25 | QoS map |
| 26 | WUR capability |
| 27 | WUR support channel |
| 28 (last) | Vendor specific |

[FIG. 34]
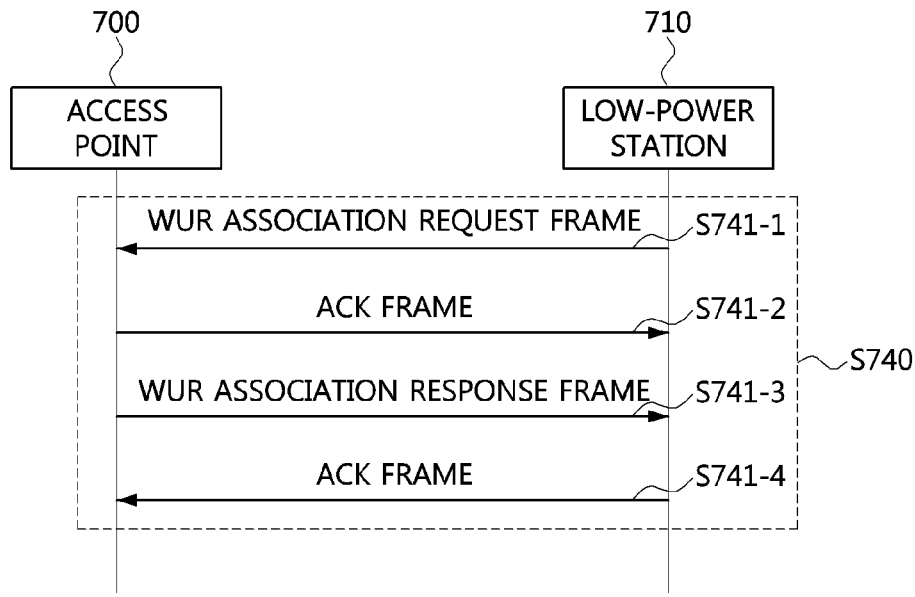
[FIG. 35]
| Index | Information Element |
|---|---|
| 1 | action |
| 2 (last-1) | at least one vendor-specific element (optional) |
| last | MME(management MIC element) |
[FIG. 36]
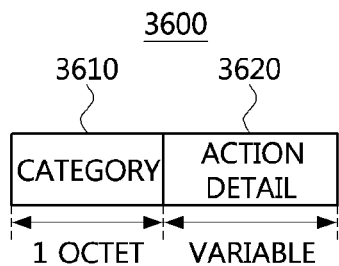

[FIG. 37]

| Code | Description | Robust | Group address privacy |
|---|---|---|---|
| 0 | Spectrum management | Yes | No |
| 1 | QoS | Yes | No |
| 2 | DLS | Yes | No |
| 3 | Block ACK | Yes | No |
| 4 | Public | No | No |
| 5 | Radio measurement | Yes | No |
| 6 | Fast BSS transition | Yes | No |
| 7 | HT | No | No |
| 8 | SA query | Yes | No |
| 9 | Protection dual of public action | Yes | No |
| 10 | WNM | Yes | No |
| 11 | Unprotected WNM | No | No |
| 12 | TDLS | - | No |
| 13 | Mesh | Yes | Yes |
| 14 | Multihop | Yes | Yes |
| 15 | Self-protected | No | No |
| 16 | Reserved | - | - |
| 17 | Reserved (used by WFA) | - | - |
| 18 | WUR | Yes | No |
| 19-125 | Reserved | - | - |
| 126 | Vendor-specific protected | Yes | No |
| 127 | Vendor-specific | No | No |
| 128-255 | Error | - | - |

[FIG. 38]

| Index | Information Element |
|---|---|
| 1 | category |
| 2 | WUR action |
| 3 | dialog token |
| 4 | WUR parameter set |

[FIG. 39]

| Value | Description |
|---|---|
| 0 | WUR association request frame |
| 1 | WUR association response frame |
| 2 | WUR disassociation frame |
| 3-255 | reserved |

[FIG. 40]
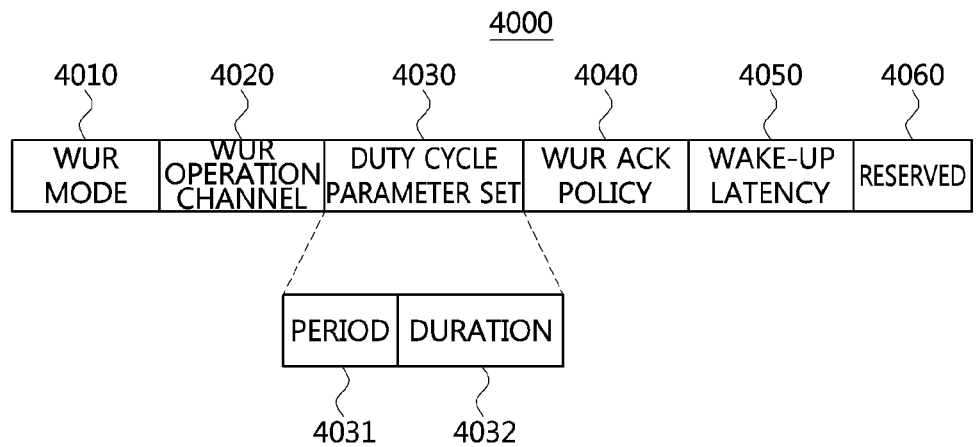
[FIG. 41]
| Index | Information Element |
|-------|---------------------|
| 1 | category |
| 2 | WUR action |
| 3 | dialog token |
| 4 | status code |
| 5 | WUR parameter set |

[FIG. 42]

| Status code | Name | Description |
|---|---|---|
| 0 | SUCCESS | Successful |
| 1 | REFUSED, REFUSED_REASON_UNSPECIFIED | Unspecified failure |
| 2 | | TDLS wakeup schedule rejected but alternative schedule provided |
| 3 | | TDLS wakeup schedule rejected |
| 4 | | Reserved |
| 5 | | Security disabled |
| 6 | | Unacceptable lifetime |
| 7 | | Not in same BSS |
| 8-9 | | Reserved |
| 10 | REFUSED_CAPABILITIES_MISMATCH | Cannot support all requested capabilities in the Capability Information field |
| 11 | | Reassociation denied due to inability to confirm that association exists |
| 12 | | Association denied due to reason outside the scope of this standard |
| 13 | | Responding STA does not support the specified authentication algorithm |
| 14 | | Received an Authentication frame with authentication transaction sequence number out of expected sequence |
| 15 | | Authentication rejected because of challenge failure |
| 16 | | Authentication rejected due to timeout waiting for next frame in sequence |

【FIG. 43】

| Status code | Name | Description |
|---|---|---|
| 17 | | Association denied because AP is unable to handle additional associated STAs |
| 18 | REFUSED_BASIC_RATES_MISMATCH | Association denied due to requesting STA not supporting all of the data rates in the BSSBasicRateSet parameter |
| 19 | | Association denied due to requesting STA not supporting the short preamble option |
| 20 | | Association denied due to requesting STA not supporting the PBCC modulation option |
| 21 | | Association denied due to requesting STA not supporting the Channel Agility option |
| 22 | | Association request rejected because Spectrum Management capability is required |
| 23 | | Association request rejected because the information in the Power Capability element is unacceptable |
| 24 | | Association request rejected because the information in the Supported Channels element is unacceptable |
| 25 | | Association denied due to requesting STA not supporting the Short Slot Time option |
| 26 | | Association denied due to requesting STA not supporting the DSSS-OFDM option |
| 27 | | Association denied because the requesting STA does not support HT features |
| 28 | | R0KH unreachable |
| 29 | | Association denied because the requesting STA does not support the phased coexistence operation (PCO) transition time required by the AP |
| 30 | REFUSED_TEMPORARILY | Association request rejected temporarily; try again later |
| 31 | | Robust management frame policy violation |
| 32 | | Unspecified, QoS-related failure |

[FIG. 44]

| Status code | Name | Description |
|---|---|---|
| 33 | | Association denied because QoS AP has insufficient bandwidth to handle another QoS STA |
| 34 | | Association denied due to excessive frame loss rates and/or poor conditions on current operating channel |
| 35 | | Association (with QoS BSS) denied because the requesting STA does not support the QoS facility |
| 36 | | Reserved |
| 37 | | The request has been declined |
| 38 | INVALID_PARAMETERS | The request has not been successful as one or more parameters have invalid values |
| 39 | REJECTED_WITH_SUGGESTED_CHANGES | The TS has not been created because the request cannot be honored; however, a suggested TSPEC is provided so that the initiating STA may attempt to set another TS with the suggested changes to the TSPEC |
| 40 | | Invalid element |
| 41 | | Invalid group cipher |
| 42 | | Invalid pairwise cipher |
| 43 | | Invalid AKMP |
| 44 | | Unsupported RSNE version |
| 45 | | Invalid RSNE capabilities |
| 46 | | Cipher suite rejected because of security policy |
| 47 | REJECTED_FOR_DELAY_PERIOD | The TS has not been created; however, the HC may be capable of creating a TS, in response to a request, after the time indicated in the TS Delay element |
| 48 | DLS_NOT_ALLOWED | Direct link is not allowed in the BSS by policy |

[FIG. 45]

| Status code | Name | Description |
|---|---|---|
| 49 | NOT_PRESENT | The Destination STA is not present within this BSS |
| 50 | NOT_QOS_STA | The Destination STA is not a QoS STA |
| 51 | | Association denied because the Listen Interval is too large |
| 52 | | Invalid FT Action frame count |
| 53 | | Invalid pairwise master key identifier (PMKID) |
| 54 | | Invalid MDE |
| 55 | | Invalid FTE |
| 56 | | Requested TCLAS processing is not supported by the AP. |
| 57 | | The AP has insufficient TCLAS processing resources to satisfy the request. |
| 58 | | The TS has not been created because the request cannot be honored; however, the HC suggests the STA transitions to other BSSs to setup the TS. |
| 59 | GAS_ADVERTISEMENT_PROTOCOL_NOT_SUPPORTED | GAS Advertisement Protocol not supported |
| 60 | NO_OUTSTANDING_GAS_REQUEST | No outstanding GAS request |
| 61 | GAS_RESPONSE_NOT_RECEIVED_FROM_SERVER | GAS Response not received from the Advertisement Server |
| 62 | GAS_QUERY_TIMEOUT | STA timed out waiting for GAS Query Response |
| 63 | GAS_QUERY_RESPONSE_TOO_LARGE | GAS Response is larger than query response length limit |
| 64 | REJECTED_HOME_WITH_SUGGESTED_CHANGES | Request refused because home network does not support request |

[FIG. 46]

| Status code | Name | Description |
|---|---|---|
| 65 | SERVER_UNREACHABLE | Advertisement Server in the network is not currently reachable |
| 66 | | Reserved |
| 67 | REJECTED_FOR_SSP_PERMISSIONS | Request refused due to permissions received via SSPN interface |
| 68 | | Request refused because AP does not support unauthenticated access |
| 69-71 | | Reserved |
| 72 | | Invalid contents of RSNE |
| 73 | | U-APSD Coexistence is not supported. |
| 74 | | Requested U-APSD Coexistence mode is not supported. |
| 75 | | Requested Interval/Duration value cannot be supported with U-APSD Coexistence. |
| 76 | | Authentication is rejected because an Anti-Clogging Token is required. |
| 77 | | Authentication is rejected because the offered finite cyclic group is not supported. |
| 78 | CANNOT_FIND_ALTERNATIVE_TBTT | The TBTT adjustment request has not been successful because the STA could not find an alternative TBTT. |
| 79 | TRANSMISSION_FAILURE | Transmission failure |
| 80 | REQUESTED_TCLAS_NOT_SUPPORTED | Requested TCLAS Not Supported. |
| 81 | TCLAS_RESOURCES_EXHAUSTED | TCLAS Resources Exhausted. |
| 82 | REJECTED_WITH_SUGGESTED_BSS_TRANSITION | Rejected with Suggested BSS Transition. |

[FIG. 47]

| Status code | Name | Description |
|---|---|---|
| 83 | | Reserved |
| 92 | REFUSED_EXTERNAL_REASON | (Re)association refused for some external reason |
| 93 | REFUSED_AP_OUT_OF_MEMORY | (Re)association refused because of memory limits at the AP |
| 94 | REJECTED_EMERGENCY_SERVICES_NOT_SUPPORTED | (Re)association refused because emergency services are not supported at the AP. |
| 95 | QUERY_RESPONSE_OUTSTANDING | GAS query response not yet received. |
| 96 – 99 | | Reserved |
| 100 | MCCAOP_RESERVATION_CONFLICT | The request failed due to a reservation conflict |
| 101 | MAF_LIMIT_EXCEEDED | The request failed due to exceeded MAF limit |
| 102 | MCCA_TRACK_LIMIT_EXCEEDED | The request failed due to exceeded MCCA track limit |
| 103-65535 | | Reserved |

[FIG. 48]
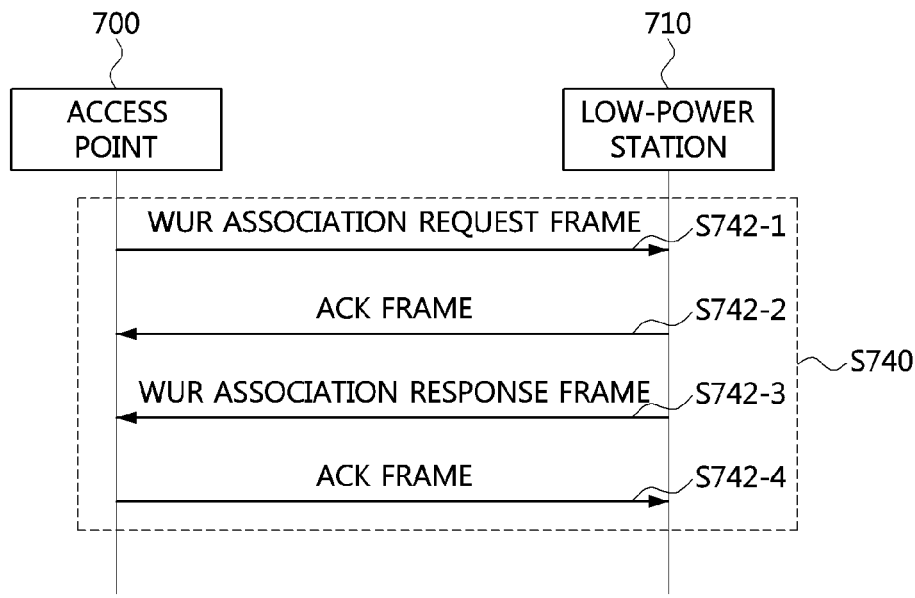
[FIG. 49]
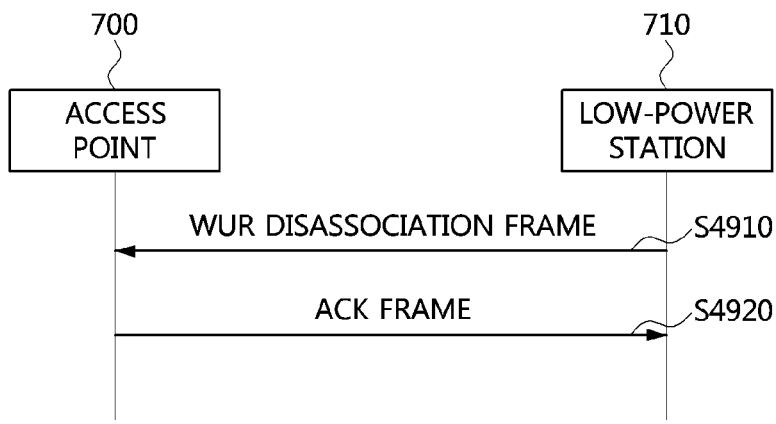

[FIG. 50]

| Index | Information Element |
|---|---|
| 1 | category |
| 2 | WUR action |
| 3 | reason code |

[FIG. 51]

| Status code | Name | Description |
|---|---|---|
| 0 | | Reserved |
| 1 | | Unspecified reason |
| 2 | | Previous authentication no longer valid |
| 3 | | Deauthenticated because sending STA is leaving (or has left) IBSS or ESS |
| 4 | | Disassociated due to inactivity |
| 5 | | Disassociated because AP is unable to handle all currently associated STAs |
| 6 | | Class 2 frame received from nonauthenticated STA |
| 7 | | Class 3 frame received from nonassociated STA |
| 8 | | Disassociated because sending STA is leaving (or has left) BSS |
| 9 | | STA requesting (re)association is not authenticated with responding STA |
| 10 | | Disassociated because the information in the Power Capability element is unacceptable |
| 11 | | Disassociated because the information in the Supported Channels element is unacceptable |
| 12 | | Disassociated due to BSS Transition Management |
| 13 | | Invalid element |
| 14 | | Message integrity code (MIC) failure |
| 15 | | 4-Way Handshake timeout |
| 16 | | Group Key Handshake timeout |
| 17 | | element in 4-Way Handshake different from (Re)Association Request/Probe Response/Beacon frame |

[FIG. 52]

| Status code | Name | Description |
|---|---|---|
| 18 | | Invalid group cipher |
| 19 | | Invalid pairwise cipher |
| 20 | | Invalid AKMP |
| 21 | | Unsupported RSNE version |
| 22 | | Invalid RSNE capabilities |
| 23 | | IEEE 802.1X authentication failed |
| 24 | | Cipher suite rejected because of the security policy |
| 25 | | TDLS direct-link teardown due to TDLS peer STA unreachable via the TDLS direct link |
| 26 | | TDLS direct-link teardown for unspecified reason |
| 27 | | Disassociated because session terminated by SSP request |
| 28 | | Disassociated because of lack of SSP roaming agreement |
| 29 | | Requested service rejected because of SSP cipher suite or AKM requirement |
| 30 | | Requested service not authorized in this location |
| 31 | SERVICE_CHANGE_PRECLUDES_TS | TS deleted because QoS AP lacks sufficient bandwidth for this QoS STA due to a change in BSS service characteristics or operational mode (e.g., an HT BSS change from 40 MHz channel to 20 MHz channel) |
| 32 | | Disassociated for unspecified, QoS-related reason |
| 33 | | Disassociated because QoS AP lacks sufficient bandwidth for this QoS STA |
| 34 | | Disassociated because excessive number of frames need to be acknowledged, but are not acknowledged due to AP transmissions and/or poor channel conditions |
| 35 | | Disassociated because STA is transmitting outside the limits of its TXOPs |

[FIG. 53]

| Status code | Name | Description |
| --- | --- | --- |
| 36 | STA_LEAVING | Requested from peer STA as the STA is leaving the BSS (or resetting) |
| 37 | END_TS<br>END_BA<br>END_DLS | Requested from peer STA as it does not want to use the mechanism |
| 38 | UNKNOWN_TS<br>UNKNOWN_BA | Requested from peer STA as the STA received frames using the mechanism for which a setup is required |
| 39 | TIMEOUT | Requested from peer STA due to timeout |
| 45 | PEERKEY_MISMATCH | Peer STA does not support the requested cipher suite |
| 46 | PEER_INITIATED | In a DLS Teardown frame: The teardown was initiated by the DLS peer<br>In a Disassociation frame: Disassociated because authorized access limit reached |
| 47 | AP_INITIATED | In a DLS Teardown frame: The teardown was initiated by the AP<br>In a Disassociation frame: Disassociated due to external service requirements |
| 48 | | Invalid FT Action frame count |
| 49 | | Invalid pairwise master key identifier (PMKI) |
| 50 | | Invalid MDE |
| 51 | | Invalid FTE |
| 52 | MESH-PEERING-CANCELLED | SME cancels the mesh peering instance with the reason other than reaching the maximum number of peer mesh STAs |
| 53 | MESH-MAX-PEERS | The mesh STA has reached the supported maximum number of peer mesh STAs |
| 54 | MESH-CONFIGURATIONPOLICY-VIOLATION | The received information violates the Mesh Configuration policy configured in the mesh STA profile |

[FIG. 54]

| Status code | Name | Description |
|---|---|---|
| 55 | MESH-CLOSE-RCVD | The mesh STA has received a Mesh Peering Close message requesting to close the mesh peering. |
| 56 | MESH-MAX-RETRIES | The mesh STA has resent dot11MeshMaxRetries Mesh Peering Open messages, without receiving a Mesh Peering Confirm message. |
| 57 | MESH-CONFIRM-TIMEOUT | The confirmTimer for the mesh peering instance times out. |
| 58 | MESH-INVALID-GTK | The mesh STA fails to unwrap the GTK or the values in the wrapped contents do not match |
| 59 | MESH-INCONSISTENT-PARAMETERS | The mesh STA receives inconsistent information about the mesh parameters between Mesh Peering Management frames |
| 60 | MESH-INVALID-SECURITY-CAPABILITY | The mesh STA fails the authenticated mesh peering exchange because due to failure in selecting either the pairwise ciphersuite or group ciphersuite |
| 61 | MESH-PATH-ERROR-NOPROXY-INFORMATION | The mesh STA does not have proxy information for this external destination. |
| 62 | MESH-PATH-ERROR-NOFORWARDING-INFORMATION | The mesh STA does not have forwarding information for this destination. |
| 63 | MESH-PATH-ERROR-DESTINATION-UNREACHABLE | The mesh STA determines that the link to the next hop of an active path in its forwarding information is no longer usable. |
| 64 | MAC-ADDRESS-ALREADY-EXISTS-IN-MBSS | The Deauthentication frame was sent because the MAC address of the STA already exists in the mesh BSS. |
| 65 | MESH-CHANNEL-SWITCH-REGULATORY-REQUIREMENTS | The mesh STA performs channel switch to meet regulatory requirements. |
| 66 | MESH-CHANNEL-SWITCH-UNSPECIFIED | The mesh STA performs channel switch with unspecified reason. |
| 67 – 65535 | | Reserved |

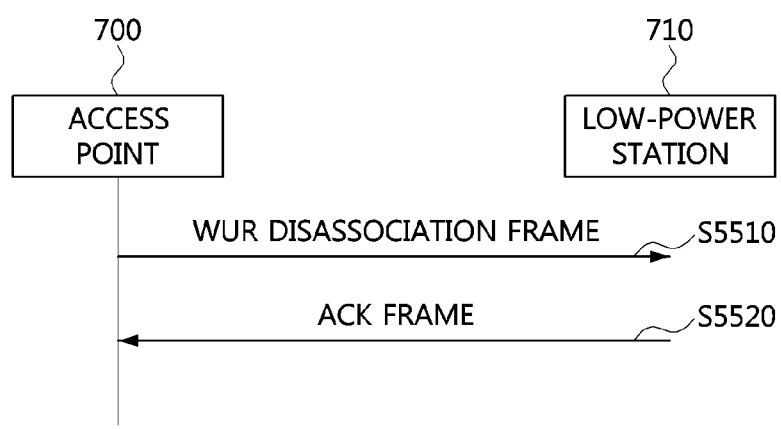
【FIG. 55】

METHOD AND APPARATUS FOR INITIAL NEGOTIATION IN WIRELESS LAN

CROSS-REFERENCE TO RELATED APPLICATIONS

This application is a U.S. National Stage of PCT/KR2017/011241 filed Oct. 12, 2017, which claims the priority benefit of Korean Patent Application No. 10-2016-0132189, filed on Oct. 12, 2016 and Korean Patent Application No. 10-2017-0004129, filed on Jan. 11, 2017 in the Korean Intellectual Property Office.

TECHNICAL FIELD

The present invention relates to a wireless local area network (WLAN) technology, and more particularly, to a technique for initial negotiation for a station supporting a low-power operation in a WLAN.

BACKGROUND ART

With the development of information and communications technology, various wireless communication technologies are under development. Among these wireless communication technologies, a WLAN enables wireless connection to the Internet at a home or business, or in specific service provision areas using a portable terminal, such as a personal digital assistant (PDA), a laptop computer, and a portable multimedia player (PMP), based on radio frequency (RF) technology.

As standards for WLAN technology, the Institute of Electrical and Electronics Engineers (IEEE) 802.11 standards are under development. The IEEE 802.11a provides a transmission speed of 54 Mbps using an unlicensed band at 5 GHz. The IEEE 802.11b provides a transmission speed of 11 Mbps using direct sequence spread spectrum (DSSS) at 2.4 GHz. The IEEE 802.11g provides a transmission speed of 54 Mbps using orthogonal frequency division multiplexing (OFDM) at 2.4 GHz.

The WLAN technology according to the IEEE 802.11n standard operates in the 2.4 GHz band and the 5 GHz band based on an orthogonal frequency division multiplexing (OFDM) scheme, and when multiple input multiple output (MIMO)-OFDM is used, a transmission speed of up to 300 Mbps can be provided through four spatial streams. Also, the WLAN technology according to the IEEE 802.11n standard can support a channel bandwidth of up to 40 MHz and can provide a transmission speed of up to 600 Mbps in this case.

With the proliferation of such WLANs and the diversification of applications using WLANs, there is an increasing necessity for new WLAN technology for supporting a higher throughput than a data processing speed of IEEE 802.11n. Very high throughput (VHT) WLAN technology is one of the IEEE 802.11 WLAN technologies proposed to support a data processing speed of 1 Gbps or higher. Among these WLAN technologies, IEEE 802.11ac is being developed as a standard for providing VHT in a 5 GHz or lower band, and IEEE 802.11ad is being developed as a standard for providing VHT in a 60 GHz band. Also, the WLAN technology according to the IEEE 802.11ax standard aims at improving the frequency efficiency in a dense environment.

Since a communication node (e.g., access point (AP), station (STA), etc.) supporting the WLAN technology operates dependently on the battery, a low-power operation method will be required to operate for a long time. In order to support the low-power operation, the communication node may include a transceiver (hereinafter, referred to as a 'primary connectivity radio (PCR)') for basic operations according to the IEEE 802.11, a transceiver (hereinafter, referred to as a 'wake-up radio (WUR)') for the low-power operation, and the like. Here, a station including the PCR and the WUR may be referred to as a low-power station (or, a WUR STA)', and a station not including the WUR may be referred to as a 'legacy station'.

Meanwhile, the legacy station may perform an access procedure to access the access point, and may transmit capability information to the access point in the access procedure. The access point may determine whether to perform the access procedure with the legacy station based on the capability information of the legacy station. However, an access procedure (e.g., initial negotiation procedure) between the low-power station and the access point is not clearly defined, and the access procedure for the low-power station is needed.

DISCLOSURE

Technical Problem

The objective of the present invention to solve the above-described problem is to provide methods for initial negotiation for a station supporting a low-power operation in a WLAN.

Technical Solution

In an operation method of a station in a communication system according to a first embodiment for achieving the above-described objective, the station including a primary connectivity radio (PCR) and a wake-up radio (WUR) may operate in a normal mode or a WUR mode, the PCR may operate in a wake-up state in the normal mode, and the WUR may operate in a wake-up state in the WUR mode. Also, the operation method may comprises generating a probe request frame including WUR capability information for the station supporting the WUR mode; transmitting the probe request frame; and receiving a probe response frame from an access point receiving the probe request frame.

Here, the WUR capability information may include at least one of information on a frequency band in which the WUR operates, information on a duty cycle for the WUR mode, information on a channel access scheme of the WUR, and information on an acknowledgement (ACK) policy for a WUR frame received in the WUR mode.

Here, the operation method may further comprise performing an authentication procedure with the access point; performing an association procedure with the access point when the authentication procedure is completed; and performing a WUR association procedure with the access point when the association procedure is completed.

Here, the station may operate in the normal mode when the association procedure is completed, and the station may operate in the normal mode or the WUR mode when the WUR association procedure is completed.

Here, the performing a WUR association procedure may comprise generating a WUR association request frame including a WUR parameter set used to support operations in a WUR-associated state between the station and the access point; transmitting the WUR association request frame to the access point; and receiving a WUR association response frame from the access point in response to the WUR association request frame.

Here, the WUR parameter set may include at least one of information on a frequency band in which the WUR operates, information indicating whether a duty cycle scheme for the WUR mode is supported, information on a duty cycle for the WUR mode, information on an acknowledgement (ACK) policy for a WUR frame received in the WUR mode, and information indicating a time required for the PCR to transition from a sleep state to the wake-up state.

Here, the WUR association response frame may include a WUR parameter set, and the WUR parameter set included in the WUR association response frame may be configured by the access point based on the WUR parameter set included in the WUR association request frame.

Here, the operation method may further comprise releasing a WUR association between the station and the access point, wherein the station transmit a WUR disassociation frame requesting release of the WUR association to the access point when the releasing of the WUR association is initiated by the station, and the station receives a WUR disassociation frame requesting release of the WUR association from the access point when the releasing of the WUR association is imitated by the access point.

In an operation method of a station in a communication system according to a second embodiment for achieving the above-described objective, the station including a primary connectivity radio (PCR) and a wake-up radio (WUR) may operate in a normal mode or a WUR mode, the PCR may operate in a wake-up state in the normal mode, and the WUR may operate in a wake-up state in the WUR mode. Also, the operation method may comprise performing a scanning procedure to search for an access point; performing an authentication procedure with the access point scanned in the scanning procedure; and performing an association procedure with the access point when the authentication procedure is completed, wherein the performing an association procedure comprises transmitting an association request frame including WUR capability information for the station supporting the WUR mode to the access point; and receiving an association response frame from the access point in response to the association request frame.

Here, the WUR capability information may include at least one of information on a frequency band in which the WUR operates, information on a duty cycle for the WUR mode, information on a channel access scheme of the WUR, and information on an acknowledgement (ACK) policy for a WUR frame received in the WUR mode.

Here, the operation method may further comprise performing a WUR association procedure with the access point when the association procedure is completed, the station may operate in the normal mode when the association procedure is completed, and the station may operate in the normal mode or the WUR mode when the WUR association procedure is completed.

Here, the performing a WUR association procedure may comprise generating a WUR association request frame including a WUR parameter set used to support operations in a WUR-associated state between the station and the access point; transmitting the WUR association request frame to the access point; and receiving a WUR association response frame from the access point in response to the WUR association request frame.

Here, the WUR parameter set may include at least one of information on a frequency band in which the WUR operates, information indicating whether a duty cycle scheme for the WUR mode is supported, information on a duty cycle for the WUR mode, information on an acknowledgement (ACK) policy for a WUR frame received in the WUR mode, and information indicating a time required for the PCR to transition from a sleep state to the wake-up state.

Here, the operation method may further comprise releasing a WUR association between the station and the access point, wherein the station transmit a WUR disassociation frame requesting release of the WUR association to the access point when the releasing of the WUR association is initiated by the station, and the station receives a WUR disassociation frame requesting release of the WUR association from the access point when the releasing of the WUR association is imitated by the access point.

In an operation method of an access point in a communication system according to a second embodiment for achieving the above-described objective, the access point may support operations of a station including a primary connectivity radio (PCR) and a wake-up radio (WUR), the station may operate in a normal mode or a WUR mode, the PCR may operate in a wake-up state in the normal mode, and the WUR may operate in a wake-up state in the WUR mode. Also, the operation method may comprise transmitting a beacon frame including WUR capability information for the station supporting the WUR mode; performing an authentication procedure with the station receiving the beacon frame; and performing an association procedure with the station when the authentication procedure is completed.

Here, the WUR capability information may include at least one of information on a frequency band in which the WUR operates, information on a duty cycle for the WUR mode, information on a channel access scheme of the WUR, and information on an acknowledgement (ACK) policy for a WUR frame received in the WUR mode.

Here, the operation method may further comprise performing a WUR association procedure with the station when the association procedure is completed, the access point may support the station operating in the normal mode when the association procedure is completed, and the access point may support the station operating in the normal mode or the WUR mode when the WUR association procedure is completed.

Here, the performing a WUR association procedure may comprise receiving, from the station, a WUR association request frame including a WUR parameter set used to support operations in a WUR-associated state between the station and the access point; transmitting a WUR association response frame to the station in response to the WUR association request frame.

Here, the WUR parameter set may include at least one of information on a frequency band in which the WUR operates, information indicating whether a duty cycle scheme for the WUR mode is supported, information on a duty cycle for the WUR mode, information on an acknowledgement (ACK) policy for a WUR frame received in the WUR mode, and information indicating a time required for the PCR to transition from a sleep state to the wake-up state.

Here, the operation method may further comprise releasing a WUR association between the station and the access point, the access point may transmit a WUR disassociation frame requesting release of the WUR association to the station when the releasing of the WUR association is initiated by the access point, and the access point may receive a WUR disassociation frame requesting release of the WUR association from the station when the releasing of the WUR association is imitated by the station.

Advantageous Effects

According to the present invention, the access procedure (e.g., initial negotiation procedure) between the low-power station and the access point can be performed, and the low-power station can access the access point by performing the access procedure. Further, the capability information of the low-power station can be exchanged in the access procedure between the low-power station and the access point. Therefore, the performance of the communication system can be improved.

DESCRIPTION OF DRAWINGS

FIG. 1 is a conceptual diagram illustrating a first embodiment of a WLAN-based communication system.

FIG. 2 is a block diagram illustrating a first embodiment of a communication node constituting a WLAN-based communication system.

FIG. 3 is a timing diagram illustrating a first embodiment of an operation method of a communication node based on EDCA.

FIG. 4 is a conceptual diagram illustrating a second embodiment of a WLAN-based communication system.

FIG. 5 is a block diagram illustrating a first embodiment of a low-power station in a WLAN-based communication system.

FIG. 6 is a block diagram illustrating a first embodiment of a WUR frame in a WLAN-based communication system.

FIG. 7 is a sequence chart illustrating a first embodiment of an initial negotiation procedure (e.g., access procedure) in a WLAN-based communication system.

FIG. 8 is a sequence chart illustrating a first embodiment of a scanning step S710 based on an active manner in a WLAN-based communication system.

FIG. 9 is a block diagram illustrating a first embodiment of a MAC frame included in a management frame in a WLAN-based communication system.

FIG. 10 is a conceptual diagram illustrating a first embodiment of information elements included in a frame body of a management frame in a WLAN-based communication system.

FIG. 11 is a conceptual diagram illustrating a second embodiment of information elements included in a frame body of a management frame in a WLAN-based communication system.

FIG. 12 is a conceptual diagram illustrating a third embodiment of information elements included in a frame body of a management frame in a WLAN-based communication system.

FIG. 13 is a conceptual diagram illustrating a fourth embodiment of information elements included in a frame body of a management frame in a WLAN-based communication system.

FIG. 14 is a conceptual diagram illustrating a fifth embodiment of information elements included in a frame body of a management frame in a WLAN-based communication system.

FIG. 15 is a conceptual diagram illustrating a sixth embodiment of information elements included in a frame body of a management frame in a WLAN-based communication system.

FIG. 16 is a block diagram illustrating a first embodiment of an information element indicating a WUR capability in a WLAN-based communication system.

FIG. 17 is a block diagram illustrating a first embodiment of an information element indicating a WUR support channel in a WLAN-based communication system.

FIG. 18 is a block diagram illustrating channels in a WLAN-based communication system.

FIG. 19 is a conceptual diagram illustrating a first embodiment of information elements included in a probe request frame in a WLAN-based communication system.

FIG. 20 is a conceptual diagram illustrating a first embodiment of information elements included in a probe response frame in a WLAN-based communication system.

FIG. 21 is a conceptual diagram illustrating a second embodiment of information elements included in a probe response frame in a WLAN-based communication system.

FIG. 22 is a conceptual diagram illustrating a third embodiment of information elements included in a probe response frame in a WLAN-based communication system.

FIG. 23 is a sequence chart illustrating a first embodiment of a scanning step S710 based on a passive manner in a WLAN-based communication system.

FIG. 24 is a conceptual diagram illustrating a first embodiment of information elements included in a beacon frame in a WLAN-based communication system.

FIG. 25 is a conceptual diagram illustrating a second embodiment of information elements included in a beacon frame in a WLAN-based communication system.

FIG. 26 is a conceptual diagram illustrating a third embodiment of information elements included in a beacon frame in a WLAN-based communication system.

FIG. 27 is a sequence chart illustrating a first embodiment of an authentication step (S720) in a WLAN-based communication system.

FIG. 28 is a sequence chart illustrating a first embodiment of an association step (S730) in a WLAN-based communication system.

FIG. 29 is a conceptual diagram illustrating a first embodiment of information elements included in an association request frame in a WLAN-based communication system.

FIG. 30 is a conceptual diagram illustrating a first embodiment of information elements included in an association response frame in a WLAN-based communication system.

FIG. 31 is a conceptual diagram illustrating a first embodiment of information elements included in a reassociation request frame in a WLAN-based communication system.

FIG. 32 is a conceptual diagram illustrating a first embodiment of information elements included in a reassociation response frame in a WLAN-based communication system.

FIG. 33 is a conceptual diagram illustrating a second embodiment of information elements included in a reassociation response frame in a WLAN-based communication system.

FIG. 34 is a sequence chart illustrating a first embodiment of a WUR association step S740 in a WLAN-based communication system.

FIG. 35 is a conceptual diagram illustrating a first embodiment of information elements included in a WUR association request frame.

FIG. 36 is a conceptual diagram illustrating a first embodiment of an action field of a WUR association request frame.

FIG. 37 is a conceptual diagram illustrating a first embodiment of codes indicated by a category field of an action field.

FIG. 38 is a conceptual diagram illustrating a first embodiment of information elements included in an action field of a WUR association request frame.

FIG. 39 is a conceptual diagram illustrating a first embodiment of a WUR action field included in an action detail field.

FIG. 40 is a conceptual diagram illustrating a first embodiment of a WUR parameter set included in an action detail field.

FIG. 41 is a conceptual diagram illustrating a first embodiment of information elements included in an action field of a WUR association response frame.

FIG. 42 is a conceptual diagram illustrating a first embodiment of status codes of a WUR association response frame.

FIG. 43 is a conceptual diagram illustrating a second embodiment of status codes of a WUR association response frame.

FIG. 44 is a conceptual diagram illustrating a third embodiment of status codes of a WUR association response frame.

FIG. 45 is a conceptual diagram illustrating a fourth embodiment of status codes of a WUR association response frame.

FIG. 46 is a conceptual diagram illustrating a fifth embodiment of status codes of a WUR association response frame.

FIG. 47 is a conceptual diagram illustrating a sixth embodiment of status codes of a WUR association response frame.

FIG. 48 is a sequence chart illustrating a second embodiment of a WUR association step S740 in a WLAN-based communication system.

FIG. 49 is a sequence chart illustrating a first embodiment of a WUR disassociation step in a WLAN-based communication system.

FIG. 50 is a conceptual diagram illustrating a first embodiment of information elements included in an action field of a WUR disassociation frame.

FIG. 51 is a conceptual diagram illustrating a first embodiment of reason codes of a WUR disassociation frame.

FIG. 52 is a conceptual diagram illustrating a second embodiment of reason codes of a WUR disassociation frame.

FIG. 53 is a conceptual diagram illustrating a third embodiment of reason codes of a WUR disassociation frame.

FIG. 54 is a conceptual diagram illustrating a fourth embodiment of reason codes of a WUR disassociation frame.

FIG. 55 is a sequence chart illustrating a second embodiment of a WUR disassociation step in a WLAN-based communication system.

MODES OF THE INVENTION

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Embodiments described in the present specification may be applied to a communication system (e.g., a wireless local area network (WLAN) based communication system) according to the Institute of Electrical and Electronics Engineers (IEEE) 802.11 standard. Also, the embodiments described in the present specification may be applied to other communication systems as well as the communication systems conforming to the IEEE 802.11 standard. For example, the embodiments described in the present specification may be applied to wireless personal area network (WPAN) based communication systems, wireless body area network (WBAN) based communication systems, 4G communication systems (e.g., long term evolution (LTE) based communication system, LTE-Advanced (LTE-A) based communication system), 5G communication system (e.g., new radio (NR) communication system), or the like.

In the WLAN-based communication system, a station (STA) may refer to a communication node performing functions of a medium access control (MAC) layer and functions of a physical layer on a wireless medium which are defined in the IEEE 802.11 standard. The STA may be classified into an access point (AP) STA and a non-AP STA. The AP STA may simply be referred to as an access point, and the non-AP STA may simply be referred to as a station. Also, the AP may be referred to as a base station (BS), a node B, an evolved node B, a relay, a radio remote head (RRH), a transmission and reception point (TRP), or the like. The station may be referred to as a terminal, a wireless transmit/receive unit (WTRU), a user equipment (UE), a device, or the like and may be a smart phone, a tablet PC, a laptop computer, a sensor device, or the like.

FIG. 1 is a conceptual diagram illustrating a first embodiment of a WLAN-based communication system.

Referring to FIG. 1, a WLAN-based communication system according to the IEEE 802.11 standard may include at least one basic service set (BSS). The BSS may indicate a set of communication nodes (e.g., APs #1-2, STAs #1-6, etc.). The BSS may be classified into an infrastructure BSS and an independent BSS (IBSS). Here, each of BSSs #1-2 may be an infrastructure BSS, and the BSS #3 may be an IBSS.

The BSS #1 may include a STA #1, an AP #1 connected to a distribution system, and the like. Also, the BSS #1 may further include the distribution system. The communications between the STA #1 and the AP #1 may be performed based on the IEEE 802.11 standard in the BSS #1. The BSS #2 may include a STA #2, a STA #3, an AP #2 connected to a distribution system, and the like. Also, the BSS #2 may further include the distribution system. The communications between the STA #2 and the AP #2, the communications between the STA #3 and the AP #2, and the like may be performed based on the IEEE 802.11 standard in the BSS #2. The communications between STAs (e.g., STAs #1-3) in the BSS #1 or BSS #2 may be performed through the AP (e.g., APs #1-2). However, when a direct link is established between STAs (e.g., STA #1-3), direct communications between the STAs (e.g., STA #1-3) may be performed.

The BSS #3 may be an IBSS operating in an ad-hoc mode. There may not be an AP which is an entity that performs a management function in the BSS #3. In the BSS #3, STAs (e.g., STAs #4-6) may be managed in a distributed manner. The STAs (e.g., STAs #4-6) may form a self-contained network since connections to the distribution system are not allowed in the BSS #3.

The plurality of BSSs (e.g., BSSs #1-2) may be interconnected via the distribution system. The plurality of BSSs connected through the distribution system may be referred to as an extended service set (ESS). The communication nodes (e.g., APs #1-2, STAs #1-3) included in the ESS may communicate with each other, and STAs (e.g., STA #1-3) belonging to the same ESS may move between BSSs (e.g., BSSs #1-2) while performing seamless communications.

The communication node (e.g., AP, STA, etc.) belonging to the WLAN-based communication system may be configured as follows.

FIG. 2 is a block diagram illustrating a first embodiment of a communication node belonging to a WLAN-based communication system.

Referring to FIG. 2, a communication node 200 may include a baseband processor 210, a transceiver 220, an antenna 230, a memory 240, an input interface unit 250, an output interface unit 260, and the like. The baseband processor 210 may perform baseband-related signal processing, and may include a MAC processor 211 and a PHY processor 212. The MAC processor 211 may perform functions of the MAC layer defined in the IEEE 802.11 standard and the PHY processor 212 may perform functions of the PHY layer defined in the IEEE 802.11 standard.

The transceiver 220 may include a transmitter 221 and a receiver 222. The antenna 230 may be configured as an antenna array to support multiple-input multiple-output (MIMO). The memory 240 may store instructions executed by the baseband processor 210 and may comprise at least one of a read only memory (ROM) and a random access memory (RAM). The input interface unit 250 may obtain information from a user of the communication node 200 and the output interface unit 260 may provide information to the user of the communication node 200. The baseband processor 210, the transceiver 220, the memory 240, the input interface unit 250 and the output interface unit 260 may be connected to each other via a bus.

Meanwhile, the communication node (e.g., AP, STA, etc.) belonging to the WLAN-based communication system may perform transmission and reception of a frame based on a point coordination function (PCF), a hybrid coordination function (HCF), a HCF controlled channel access (HCCA) function, an enhanced distributed channel access (EDCA) function, or the like.

In the WLAN-based communication system, a frame may be classified into a management frame, a control frame, and a data frame. The management frame may include an association request frame, an association response frame, a reassociation request frame, a reassociation response frame, a probe request frame, a probe response frame, a beacon frame, a disassociation frame, an authentication frame, a deauthentication frame, an action frame, and the like.

The control frame may include an acknowledgment (ACK) frame, a block ACK request (BAR) frame, a block ACK (BA) frame, a power saving (PS)-Poll frame, a request to send (RTS) frame, a clear to send (CTS) frame, and the like. The data frame may be classified into a quality of service (QoS) data frame and a non-QoS data frame. The QoS data frame may indicate a data frame requiring transmission according to the QoS, and the non-QoS data frame may indicate a data frame not requiring transmission according to the QoS.

FIG. 3 is a timing diagram illustrating a first embodiment of an operation method of a communication node based on EDCA.

Referring to FIG. 3, a communication node desiring to transmit a control frame (or a management frame) may perform a channel state monitoring operation (e.g., carrier sensing operation) during a predetermined period (e.g., short interframe space (SIFS) or PCF IFS (PIFS)), and when the channel state is determined to be idle during the predetermined period (e.g., SIFS or PIFS), the communication node may transmit the control frame (or the management frame). For example, the communication node may transmit an ACK frame, a BA frame, a CTS frame, or the like when the channel state is determined to be idle during SIFS. Also, the communication node may transmit a beacon frame or the like when the channel state is determined to be idle during the PIFS. On the other hand, when it is determined that the channel state is busy during the predetermined period (e.g., SIFS or PIFS), the communication node may not transmit the control frame (or the management frame). Here, the carrier sensing operation may refer to a clear channel assessment (CCA) operation.

A communication node desiring to transmit a non-QoS data frame may perform a channel state monitoring operation (e.g., carrier sensing operation) during DCF IFS (DIFS), and when the channel state is determined to be idle during the DIFS, the communication node may perform a random backoff procedure. For example, the communication node may select a backoff value (e.g., a backoff counter) within a contention window according to the random backoff procedure and may perform a channel state monitoring operation (e.g., carrier sensing operation) during a period corresponding to the selected backoff value (hereinafter, referred to as 'backoff period'). The communication node may transmit the non-QoS data frame when the channel state is determined to be idle during the backoff period.

A communication node desiring to transmit a QoS data frame may perform a channel state monitoring operation (e.g., carrier sensing operation) during an arbitration IFS (AIFS), and when the channel state is determined to be idle during the AIFS, the communication node may perform a random backoff procedure. The AIFS may be configured according to an access category (AC) of a data unit (e.g., protocol data unit (PDU)) included in the QoS data frame. The AC of the data unit may be as shown in Table 1 below.

TABLE 1

| Priority | AC | Description |
|---|---|---|
| Lowest | AC_BK | Background |
|  | AC_BE | Best effort |
|  | AC_VI | Video |
| Highest | AC_VO | Voice |

AC_BK may indicate background data, AC_BE may indicate data transmitted in the best effort manner, AC VI may indicate video data, AC_VO may indicate voice data. For example, the length of the AIFS for the QoS data frame corresponding to each of AC_VO and AC VI may be configured to be equal to the length of the DIFS. The length of the AIFS for the QoS data frame corresponding to each of AC_BE and AC_BK may be configured to be longer than the length of the DIFS. Here, the length of the AIFS for the QoS data frame corresponding to AC_BK may be configured to be longer than the length of the AIFS for the QoS data frame corresponding to AC_BE.

In the random backoff procedure, the communication node may select a backoff value (e.g., a backoff counter) within a contention window according to the AC of the QoS data frame. The contention window according to the AC may be as shown in Table 2 below. $CW_{min}$ may indicate a minimum value of the contention window, $CW_{max}$ may indicate a maximum value of the contention window, and each of the minimum value and the maximum value of the contention window may be represented by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may perform a channel state monitoring operation (e.g., carrier sensing operation) during the backoff period and may transmit the QoS data frame when the channel state is determined to be idle during the backoff period.

FIG. 4 is a conceptual diagram illustrating a second embodiment of a WLAN-based communication system.

Referring to FIG. 4, a WLAN-based communication system may include an AP 400, STAs supporting a low-power operation (hereinafter referred to as low-power (LP) STA') 411, 412 and 413, STAs 421, 422 and 423 which do not support the low-power operation (hereinafter referred to as 'legacy STA'), and the like. The low-power STAs 411, 412 and 413 and the legacy STAs 421, 422 and 423 may belong to coverage of the AP 400, and the AP 400 may provide communication services to the low-power STAs 411, 412 and 413 and the legacy STAs 421, 422 and 423. The low-power STA #1 411 and the legacy STA #2 422 may be smart phones, and the low-power STA #2 412, the low-power STA #3 413, the legacy STA #1 421, and the legacy STA #3 423 may be sensor devices.

The AP 400 may support communication protocols used by the low-power STAs 411, 412, and 413 and the legacy STAs 421, 422, and 423, respectively. The low-power STAs 411, 412, and 413 may use communication protocols defined in the IEEE 802.11ba standard. Also, the low-power STAs 411, 412, and 413 may use communication protocols defined in other standards such as IEEE 802.11a/b/g/n/ac/ax/ad/ay, etc. as well as the communication protocol defined in the IEEE 802.11ba standard. The legacy STAs 421, 422 and 423 may use the communication protocols defined in standards (e.g., IEEE 802.11a/b/g/n/ac/ax/ay, etc.) other than IEEE 802.11ba standard.

The legacy STAs 421, 422 and 423 may be configured the same or similar to the communication node 200 shown in FIG. 2, and the low-power STAs 411, 412 and 413 may be configured as follows.

FIG. 5 is a block diagram illustrating a first embodiment of a low-power station in a WLAN-based communication system.

Referring to FIG. 5, a low-power STA 500 may include a baseband processor 510, a primary connectivity radio (PCR) 520, an antenna 530, a memory 540, an input interface unit 550, an output interface unit 560, a wake-up radio (WUR) 570, and the like. For example, the low-power STA 500 may further include the WUR 570 as compared to the communication node 200 of FIG. 2. The functions of each of the baseband processor 510, the PCR 520, the antenna 530, the memory 540, the input interface unit 550, and the output interface unit 560 included in the low-power STA 500 may be are the same as or similar to the functions of each of the baseband processor 210, the transceiver 220, the antenna 230, the memory 240, the input interface unit 250, and the output interface unit 260 included in the communication node 200 of FIG. 2.

The PCR 520 may perform the same or similar functions as the transceiver 220, and transmit and receive a legacy frame (e.g., a legacy signal). Also, the PCR 520 may perform the PHY layer functions. The legacy frame may be a frame configured according to the IEEE 802.11 standard (e.g., IEEE 802.11a/b/g/n/ac/ax/ay, etc.). For example, the PCR 520 may transmit and receive frames (e.g., control frames, management frames, data frames) defined in the IEEE 802.11 standard and may operate in at least one of the 2.4 GHz frequency band and the 5 GHz frequency band. Also, the PCR 520 may support 20 MHz bandwidth, 40 MHz bandwidth, 80 MHz bandwidth, 160 MHz bandwidth, or the like.

The WUR 570 may comprise at least one of a wake-up transmitter (WUTx) and a wake-up receiver (WURx). The WUTx may perform a function of transmitting a WUR frame (e.g., WUR PPDU), and the WURx may perform a function of receiving a WUR frame (e.g., WUR PPDU). The WUR 570 may be located in the PCR 520, or may be configured independently from the PCR 520. The WUR 570 and the PCR 520 may share the same antenna 530. Alternatively, the antenna for the WUR 570 may be configured separately from the antenna for the PCR 520. For example, the low-power STA 500 may comprise a first antenna (not shown) for the WUR 570 and a second antenna (not shown) for the PCR 520. The communications between the WUR 570 and the PCR 520 may be performed using primitive signals, signals according to application protocol interfaces (APIs), or the like. Also, the WUR 570 may perform the PHY layer functions.

The WUR 570 may operate in a band narrower than 20 MHz (e.g., 4 MHz, 8 MHz, 16 MHz, etc.) and the power consumption of WUR 570 may be less than 1 mW. The WUR 570 may receive a WUR frame (e.g., a wake-up packet, a WUR beacon frame, etc.) and may demodulate a received signal to identify information included in the received signal. The WUR frame may be modulated in an on-off keying (OOK) scheme, or may be a frame configured in accordance with the IEEE 802.11ba standard.

Each of the PCR 520 and the WUR 570 may operate in a wake-up state or a sleep state. The wake-up state may indicate a state in which power is supplied to the corresponding entity (e.g., PCR 520 or WUR 570), and may be referred to as "on state, "activation state", "enable state", "awake state", or the like. The sleep state may indicate a state in which no power or a minimum power is supplied to the corresponding entity (e.g., PCR 520 or WUR 570), and may be referred to as "off state", "deactivation state", "disable state", "doze state", or the like.

The low-power STA 500 may support two modes as shown in Table 3 below.

TABLE 3

|  | PCR | WUR |
| --- | --- | --- |
| Normal mode | Wake-up state | Sleep state (or, wake-up state) |
| WUR mode | Sleep state (or, wake-up state) | Wake-up state |

A duty cycle for the WUR mode may be defined. For example, a period and a duration in which the low-power station 500 operates in the WUR mode may be configured, and the low-power station 500 may operate in the WUR mode in a time domain indicated by the period and duration. The low-power station 500 may operate in the normal mode in a time domain other than the time domain indicated by the period and duration.

In the normal mode, the PCR 520 of the low-power STA 500 may operate in the wake-up state and the WUR 570 of the low-power STA 500 may operate in the sleep state. Alternatively, in the normal mode, the WUR 570 of the low-power STA 500 may operate in the wake-up state. For example, the PCR 520 operating in the wake-up state may perform transmission and reception procedures of a frame (e.g., a legacy frame or a legacy signal) with another communication node. In the WUR mode, the PCR 520 of the low-power STA 500 may operate in the sleep state and the WUR 570 of the low-power STA 500 may operate in the wake-up state. Alternatively, in the WUR mode, the PCR 520 of the low-power STA 500 may operate in the wake-up state. For example, the WUR 570 operating in the wake-up state may perform a channel state monitoring operation (e.g., carrier sensing operation) to receive a wake-up packet. Here, the wake-up packet may request the low-power STA 500 to operate in the normal mode.

When the wake-up packet is received from another communication node, the WUR 570 may transmit to the PCR 520 a wake-up indicator requesting the PCR 520 to operate in the wake-up state. When the wake-up indicator is received from the WUR 570, the operation state of the PCR 520 may transition from the sleep state to the wake-up state. When the wake-up indicator is transmitted to the PCR 520 or when the operation state of the PCR 520 transitions from the sleep state to the wake-up state, the operation state of the WUR 570 may transition from the wake-up state to the sleep state. Alternatively, the operation state of the WUR 570 may transition from the wake-up state to the sleep state when a sleep indicator requesting the WUR 570 to operate in the sleep state is received from the PCR 520. Here, a time required for the transition from the WUR mode to the normal mode may be referred to as 'mode transition time'. For example, the mode transition time may indicate a time from the reception of the wake-up packet to a time when the low-power STA operates in the normal mode. Alternatively, the mode transition time may indicate a time required for transitioning from the normal mode to the WUR mode.

When the operation of frame transmission and reception is completed, the operation state of the PCR 520 may transition from the wake-up state to the sleep state. In this case, the PCR 520 may transmit to the WUR 570 a wake-up indicator requesting the WUR 570 to operate in the wake-up state. When the wake-up indicator is received from the PCR 520, the operation state of the WUR 570 may transition from the sleep state to the wake-up state. When the wake-up indicator is transmitted to the WUR 570 or when the operation state of the WUR 570 transitions from the sleep state to the wake-up state, the operation state of the PCR 520 may transition from the wake-up state to the sleep state.

Also, the baseband processor 510 (e.g., a MAC processor 511 included in the baseband processor 510) may operate in the wake-up state or the sleep state based on the operation state of the PCR 520. For example, the baseband processor 510 (e.g., the MAC processor 511) may also operate in the wake-up state when the PCR 520 operates in the wake-up state, and the baseband processor 510 (e.g., the MAC processor 511) may also operate in the sleep state when the PCR 520 operates in the sleep state. For example, when a wake-up indicator requesting to operate in the wake-up state is received from the PCR 520 operating in the wake-up state, the operation state of the baseband processor 510 (e.g., MAC processor 511) may transition from the sleep state to the wake-up state. When a sleep indicator requesting to operate in the sleep state is received from the PCR 520 to operate in the sleep state, the operation state of the baseband processor 510 (e.g., MAC processor 511) may transition from the wake-up state to the sleep state. Alternatively, the baseband processor 510 may always operate in the wake-up state regardless of the operation state of the PCR 520.

Meanwhile, an AP supporting low-power operations may be configured the same as or similar to the low-power STA 500 described above. For example, the AP may include the baseband processor 510, the PCR 520, the antenna 530, the memory 540, the input interface unit 550, the output interface unit 560, the WUR 570, and the like. The WUR may operate in a band narrower than 20 MHz (e.g., 4 MHz, 8 MHz, 16 MHz, etc.) and the power consumption of WUR 570 may be less than 1 mW. The WUR may transmit a WUR frame (e.g., a wake-up packet, a WUR beacon frame, an alive frame, etc.). The WUR frame may be modulated in the OOK scheme, or may be a frame configured in accordance with the IEEE 802.11ba standard.

FIG. 6 is a block diagram illustrating a first embodiment of a WUR frame in a WLAN-based communication system.

Referring to FIG. 6, a WUR frame 600 may include a legacy preamble 610 and a WUR physical layer convergence protocol (PCLP) protocol data unit (WUR PPDU) 620. The legacy preamble 610 may include a legacy short training field (L-STF) 611, a legacy long training field (L-LTF) 612, and a legacy signal (L-SIG) field 613. The size of the frequency band to which the legacy preamble 610 is mapped may be 20 MHz.

The WUR PPDU 620 may include a WUR preamble 621 and a WUR payload. The WUR payload of the WUR PPDU 620 may include a MAC header 622, a frame body 623 and a frame check sequence (FCS) field 624. The WUR PPDU 620 may be modulated based on an OOK scheme. The size of the frequency band to which the WUR PPDU 620 is mapped may be smaller than 20 MHz. For example, the size of the frequency band to which the WUR PPDU 620 is mapped may be 4 MHz, 8 MHz, 16 MHz, or the like. The WUR PPDU 620 may be duplicated in the 20 MHz frequency band. Alternatively, a plurality of WUR PPDUs may be multiplexed on the frequency axis.

The WUR preamble 621 may include a WUR-STF, a WUR-LTF, and at least one WUR-SIG field. Also, the WUR preamble 621 may include a pseudo random (PN) sequence used for synchronization between the access point and the low-power station (e.g., the WUR included in the low-power station). The MAC header 622 may include a transmitter address field and a receiver address field. For example, the transmitter address field of the MAC header 622 may indicate an address of the access point that transmitted the WUR frame 600, and the receiver address field of the MAC header 622 may indicate an address (e.g., MAC address, association identifier (AID), partial AID (PAID), WUR ID, or the like) of the low-power station to receive the WUR frame 600. The address of the low-power station (e.g., AID, PAID, WUR ID, etc.) may be used to identify the low-power station in a BSS of the access point. When the WUR frame 600 is transmitted in a broadcast manner, the receiver address field of the MAC header 622 may indicate a broadcast address (or, group address, group ID). When the WUR frame 600 is transmitted in a multicast manner, the receiver address field of the MAC header 622 may indicate a multicast address (or, group address, group ID).

Next, operation methods of a communication node (e.g., access point, station, low-power station, or the like) supporting the low-power operation in a WLAN-based communication system will be described. Even when a method (e.g., transmission or reception of a frame) performed at the first communication node among the communication nodes is described, the corresponding second communication node may perform a method (reception or transmission of the frame) corresponding to the method performed at the first communication node. That is, when the operation of the station is described, the corresponding access point may perform an operation corresponding to the operation of the station. Conversely, when the operation of the access point is described, the corresponding station may perform an operation corresponding to the operation of the access point.

FIG. 7 is a sequence chart illustrating a first embodiment of an initial negotiation procedure (e.g., access procedure) in a WLAN-based communication system.

Referring to FIG. 7, a WLAN-based communication system may comprise an access point 700, a low-power station 710, and the like. The WLAN-based communication system of FIG. 7 may be configured to be the same as or similar to the WLAN-based communication system of FIG. 4. In this case, the access point 700 of FIG. 7 may be the access point 400 of FIG. 4, and the low-power station 710 of FIG. 7 may be one of the low-power stations 411, 412, and 413 of FIG. 4. Also, the access point 700 and the low-power station 710 may be configured to be the same as the low-power station 500 of FIG. 5.

The initial negotiation procedure (e.g., access procedure) may include a scanning step S710, an authentication step S720, an association step (or, reassociation step) S730, and a WUR association step S740. Here, each of the scanning step S710, the authentication step S720, the association step S730, and the WUR association step S740 may be referred to as a scanning procedure, an authentication procedure, an association procedure (or, reassociation procedure), and a WUR association procedure. The initial negotiation procedure may be performed by a PCR of a communication node (e.g., access point 700, low-power station 710). That is, frames used in the initial negotiation procedure may be transmitted and received by the PCR of the communication node (e.g., access point 700, low power station 710). The scanning step S710 may be performed in an active or passive manner, and capability information of the low-power station 710 may be exchanged between the access point 700 and the low-power station 710 in the scanning step S710. Authentication on the low-power station 710 may be performed between the access point 700 and the low-power station 710 in the authentication step S720.

In the association step (or, reassociation step) S730, an association between the access point 700 and the low-power station 710 may be established, and the capability information of the low-power station 710 may be exchanged between the access point 700 and the low-power station 710. After the association between the access point 700 and the low-power station 710 is completed, the access point 700 may support the low-power station 710 operating in the normal mode (e.g., the normal mode of Table 3), and the low-power station 710 may operate in the normal mode. In the WUR association step S740, a WUR association between the access point 700 and the low-power station 710 may be established. After the WUR association between the access point 700 and the low-power station 710 is completed, the access point 700 may support the low-power station 710 operating in the normal mode (e.g., the normal mode of Table 3) or the WUR mode (e.g., the WUR mode of Table 3), and the low-power station 710 may operate in the normal mode or the WUR mode.

Meanwhile, the scanning step S710 based on the active manner may be performed as follows.

FIG. 8 is a sequence chart illustrating a first embodiment of a scanning step S710 based on an active manner in a WLAN-based communication system.

Referring to FIG. 8, a communication system may comprise access point groups #1 to #n (i.e., 700-1 to 700-$n$), a low-power station 710, and the like. Each of the access point groups 700-1, 700-2, . . . , and 700-$n$ may include at least one access point. For example, the access point group #1 700-1 may include an access point #1-1 700-1-1, an access point #1-2 700-1-2, . . . , and an access point #1-$m$ 700-1-$m$. The access point group #2 700-2 may include an access point #2-1 700-2-1, an access point #2-2 700-2-2, . . . , and an access point #2-1700-2-1. The access point group #n 700-$n$ may include an access point #n-1 700-$n$-1, an access point #n-2 700-$n$-2, . . . , and an access point #n-o 700-$n$-$o$.

The access point group #1 700-1 may operate in a channel #1, the access point group #2 700-2 may operate in a channel #2, and the access point group #n 700-$n$ may operate in a channel #k. The bandwidth of the channel may be 1.25 MHz, 2.5 MHz, 5 MHz, 10 MHz, 20 MHz, 40 MHz, 80 MHz, 160 MHz, or the like. Each of n, m, 1, o, and k may be a positive integer. Each of the access points belonging to the access point groups 700-1, 700-2, . . . , and 700-$n$ and the low-power stations 710 of FIG. 8 may be the same as the access point 700 and the low-power station 710 of FIG. 7, and may be configured to be the same as the low-power station 500 of FIG. 5.

The low-power station 710 may generate a probe request frame. The probe request frame may be a management frame, and a MAC frame included in the management frame may be as follows.

FIG. 9 is a block diagram illustrating a first embodiment of a MAC frame included in a management frame in a WLAN-based communication system.

Referring to FIG. 9, a MAC frame 900 may include a MAC header 910, a frame body 920, and an FCS field 930. The MAC header 910 may include a frame control field 911, a duration/ID field 912, an address 1 field 913, an address 2 field 914, an address 3 field 915, and a sequence control field 916.

The frame control field 911 may include a plurality of sub fields, and may indicate a protocol version, a type (e.g., management frame, control frame, or data frame), a data unit (DU) fragment information, retransmission information, and the like. The duration/ID field 912 may indicate a duration for a network allocation vector (NAV) or an AID (or, WUR ID). The address 1 field 913 may indicate a destination address of the MAC frame 900. For example, the address 1 field 913 may indicate an address or a group address of a specific communication node (e.g., access point, station, low-power station, etc.). The address 2 field 914 may indicate an address of the communication node (e.g., access point, station, low-power station, etc.) that transmitted the MAC frame 900. For example, the address 2 field 914 may indicate a source address (SA), and may be referred to as an 'SA field'. The address 3 field 915 may indicate an identifier of a basic service set (BSS) to which the communication node (e.g., access point, station, low power station, etc.) that transmitted the MAC frame 900 belongs, and may be referred to as a 'BSSID field'. The sequence control field 916 may indicate a sequence number of a service data unit (SDU) or a protocol data unit (PDU).

The frame body 920 may include at least one information element. The information elements included in the frame body 920 of the management frame may be as follows.

FIG. 10 is a conceptual diagram illustrating a first embodiment of information elements included in a frame body of a management frame in a WLAN-based communication system, FIG. 11 is a conceptual diagram illustrating a second embodiment of information elements included in a frame body of a management frame in a WLAN-based communication system, FIG. 12 is a conceptual diagram illustrating a third embodiment of information elements included in a frame body of a management frame in a WLAN-based communication system, FIG. 13 is a conceptual diagram illustrating a fourth embodiment of information elements included in a frame body of a management frame in a WLAN-based communication system, FIG. 14 is a conceptual diagram illustrating a fifth embodiment of information elements included in a frame body of a management frame in a WLAN-based communication system, and FIG. 15 is a conceptual diagram illustrating a sixth embodiment of information elements included in a frame body of a management frame in a WLAN-based communication system.

Referring to FIGS. 10 to 15, at least one information element among information elements corresponding to ID #0 to ID #255 may be included in the frame body 920 of the management frame. When the management frame is used for the low-power station 710, the frame body 920 of the management frame may include an information element indicating a WUR capability (i.e., the information element corresponding to ID #222 of FIG. 15), an information element indicating a WUR support channel (i.e., the information element corresponding to ID #223 of FIG. 15), and the like.

The information element indicating the WUR capability in the frame body 920 of the management frame may be as follows.

FIG. 16 is a block diagram illustrating a first embodiment of an information element indicating a WUR capability in a WLAN-based communication system.

Referring to FIG. 16, the frame body 920 of the management frame may include an element ID field 921, a length field 922, and a WUR capability field 923. The element ID field 921 may indicate an ID of the information element included in the frame body 920. For example, the element ID field 921 may be set to '222' of FIG. 15. The length field 922 may indicate the length of the WUR capability field 923.

The WUR capability field 923 may include a WUR band field 923-1, a duty cycle field 923-2, a QoS mode field 923-3, a WUR ACK field 923-4, and a reserved field 923-5. The WUR band field 923-1 may indicate a band (e.g., channel, frequency) in which the low-power station 710 (e.g., the WUR included in the low-power station 710) operates. For example, the WUR band field 923-1 may indicate an in-band, an out-of-band, or an in-band/out-of-band, and may be configured as shown in Table 4 below.

TABLE 4

| Bit value | Description |
| --- | --- |
| 00 | In-band |
| 01 | Out-of-band |
| 10 | In-band/Out-of-band |
| 11 | Reserved |

For example, the WUR band field 923-1 set to '00' may indicate that the WUR of the low-power station 710 operates in the same band as the PCR of the low-power station 710. The WUR band field 923-1 set to '01' may indicate that the WUR of the low-power station 710 operates in a band other than that of the PCR of the low power-station 710. The WUR band field 923-1 set to '10' may indicate that the WUR of the low-power station 710 operates in the same band as the PCR of the low-power station 710 and in a band other than that of the PCR of the low-power station 710.

The duty cycle field 923-2 may indicate whether the WUR of the low-power station 710 operates according to a duty cycle scheme (e.g., whether the WUR of the low-power station 710 supports the duty cycle scheme). Also, when the WUR of the low-power station 710 operates according to the duty cycle scheme, the duty cycle field 923-2 may indicate a period and a duration in which the low-power station operates in the WUR mode.

The QoS mode field 923-3 may indicate a channel access scheme of the low-power station 710 (e.g., the WUR of the low-power station 710). For example, the QoS mode field 923-3 may indicate PCF, HCF, HCCA, DCF, or EDCA.

The WUR ACK field 923-4 may indicate whether or not an ACK protocol is supported. For example, the WUR ACK field 923-4 set to '0' may indicate that the ACK protocol is not supported, in which case an ACK frame (or NACK frame) for the frame may not be transmitted. The WUR ACK field 923-4 set to '1' may indicate that the ACK protocol is supported, in which case an ACK frame (or NACK frame) for the frame may be transmitted. Alternatively, the WUR ACK field 923-4 may indicate an ACK scheme for the WUR frame (e.g., the WUR frame of FIG. 6). For example, the WUR ACK field 923-4 may indicate a 'no-ACK' scheme, an 'immediate' ACK scheme, or a 'delayed' ACK scheme.

The information element indicating the WUR support channel in the frame body 920 of the management frame may be as follows FIG. 17 is a block diagram illustrating a first embodiment of an information element indicating a WUR support channel in a WLAN-based communication system, and FIG. 18 is a block diagram illustrating channels in a WLAN-based communication system.

Referring to FIGS. 17 and 18, the frame body 920 of the management frame may include an element ID field 921, a length field 922, and a WUR support channel field 924. The element ID field 921 may indicate an ID of the information element included in the frame body 920. For example, the element ID field 921 may be set to '223' of FIG. 15. The length field 922 may indicate the length of the WUR support channel field 924. The WUR support channel field 924 may include a channel number field 924-1, a WUR channel number field 924-2, a WUR channel count field 924-3, and a reserved field 924-4.

Meanwhile, the communication node (e.g., access point, station, low-power station, etc.) may operate in at least one of a plurality of channels (e.g., channels #1 to #n). The bandwidth of the channel may be 20 MHz, 40 MHz, 80 MHz, 160 MHz, or the like, and each of the channels may include a plurality of WUR channels (e.g., WUR channels #1 to #m). The bandwidth of the WUR channel may be less than 20 MHz. For example, the bandwidth of the WUR channel may be 4 MHz, 8 MHz, 16 MHz, or the like. The WUR of the low-power station 710 may perform communications using at least one WUR channel belonging to one channel. Here, each of n and m may be a positive integer.

The channel number field 924-1 may indicate at least one channel supported (or used) by the communication node. For example, the channel number field 924-1 may indicate the first channel among a plurality of channels supported (or used) by the communication node. The WUR channel number field 924-2 may indicate at least one WUR channel supported (or used) by the communication node. For example, the WUR channel number field 924-2 may indicate the first WUR channel among a plurality of WUR channels supported (or used) by the communication node. The WUR channel count field 924-3 may indicate the number of at least one WUR channel supported (or used) by the communication node. Thus, within the channel indicated by the channel number field 924-1, as many WUR channels as indicated by the WUR channel count field 924-3 from the WUR channel indicated by the WUR channel field 924-2 may be supported (or used) by the communication node.

Meanwhile, information elements included in the frame body of the probe request frame of FIG. 8 may be as follows.

FIG. 19 is a conceptual diagram illustrating a first embodiment of information elements included in a probe request frame in a WLAN-based communication system.

Referring to FIG. 19, a probe request frame may include at least one information element among information elements #1 to #16. For example, the probe request frame generated by the low-power station 710 of FIG. 8 may include an information element (e.g., information element #14) indicating the WUR capability, an information element indicating the WUR support channel (e.g., information element #15), and the like. The information element indicating the WUR capability may include the information (e.g., WUR band, duty cycle, QoS mode, WUR ACK, etc.) indicated by the WUR capability field 923 of FIG. 16. The information element indicating the WUR support channel may include the information (e.g., channel number, WUR channel number, WUR channel count, etc.) indicated by the WUR support channel field 924 of FIG. 17.

Referring again to FIG. 8, the low-power station 710 may transmit the probe request frame on the channel #1 (e.g., channel #1 of FIG. 18) (S711-1). The probe request frame may be transmitted in a broadcast or multicast manner. When a probe response frame, which is a response to the probe request frame, is not received in the channel #1 within a predetermined time from the end of transmission of the probe request frame, the low-power station 710 may move from the channel #1 to the channel #2 (e.g., channel #2 of FIG. 18). That is, the operation channel of the low-power station 710 may be changed from the channel #1 to the channel #2.

Alternatively, the access points 700-1-1, 700-1-2, . . . , and 700-1-m belonging to the access point group #1 700-1 operating in the channel #1 may receive the probe request frame from the low-power station 710, identify the information elements included in the probe request frame, and generate a probe response frame in response to the probe request frame. The information elements included in the frame body of the probe response frame may be as follows.

FIG. 20 is a conceptual diagram illustrating a first embodiment of information elements included in a probe response frame in a WLAN-based communication system, FIG. 21 is a conceptual diagram illustrating a second embodiment of information elements included in a probe response frame in a WLAN-based communication system, and FIG. 22 is a conceptual diagram illustrating a third embodiment of information elements included in a probe response frame in a WLAN-based communication system.

Referring to FIGS. 20 to 22, the probe response frame may include at least one information element among information elements #1 to #58. For example, the probe response frame generated by the low-power station 710 of FIG. 8 may include an information element indicating the WUR capability (e.g., information element #55), an information element indicating the WUR support channel (e.g., information element #56), and the like. The information element indicating the WUR capability may include the information (e.g., WUR band, duty cycle, QoS mode, WUR ACK, etc.) indicated by the WUR capability field 923 of FIG. 16. The information element indicating the WUR support channel may include the information (e.g., channel number, WUR channel number, WUR channel count, etc.) indicated by the WUR support channel field 924 of FIG. 17.

Referring again to FIG. 8, the access points 700-1-1, 700-1-2, . . . , and 700-1-m belonging to the access point group #1 700-1 may transmit the probe response frame from the low-power station 710 (S711-2). The low-power station 710 may receive the probe response frame from the access points 700-1-1, 700-1-2, . . . , and 700-1-m belonging to the access point group #1 700-1, and identify the information elements included in the probe response frame. The exchange procedure of the probe request/response frames described above may be performed in the channels #1 to #k. For example, when a probe response frame is received or a probe response frame is not received within a predetermined time in the channel #(k−1), the low-power station 710 may move from the channel #(k−1) to the channel #k. That is, the operation channel of the low-power station 710 may be changed from the channel #(k−1) to the channel #k.

The low-power station 710 may transmit a probe request frame (e.g., a probe request frame including the information elements of FIG. 19) in the channel #k (S711-5). The access points **700-*n*-1, 700-*n*-2, . . . , and 700-*n*-o belonging to the access point group #n 700-*n* operating in the channel #k may receive the probe request frame from the low-power station 710, identify the information elements included in the probe request frame, and generate a probe response frame (e.g., a probe response frame including the information elements of FIGS. 20 to 22). The access points 700-*n*-1, 700-*n*-2, . . . , and 700-*n*-o belonging to the access point group #n 700-*n* may transmit the probe response frame to the low-power station 710 (S711-6). The low-power station 710 may receive the probe response frame from the access points 700-*n*-1, 700-*n*-2, . . . , and 700-*n*-o belonging to the access point group #n 700-*n***, and identify the information elements included in the probe response frame.

On the other hand, the scanning step S710 based on the passive manner may be performed as follows.

FIG. 23 is a sequence chart illustrating a first embodiment of a scanning step S710 based on a passive manner in a WLAN-based communication system.

Referring to FIG. 23, a communication system may comprise access point groups #1 to #n (i.e., 700-1 to **700-*n*), a low-power station 710, and the like. Each of the access point groups 700-1, 700-2, . . . , and 700-*n* may include at least one access point. For example, the access point group #1 700-1 may include an access point #1-1 700-1-1, an access point #1-2 700-1-2**, . . . , and an access point #1-*m* **700-1-*m*. The access point group #2 700-2 may include an access point #2-1 700-2-1, an access point #2-2 700-2-2, . . . , and an access point #2-1 700-2-1. The access point group #n 700-*n* may include an access point #n-1 700-*n*-1, an access point #n-2 700-*n*-2, . . . , and an access point #n-o 700-*n*-o**.

The access point group #1 700-1 may operate in a channel #1, the access point group #2 700-2 may operate in a channel #2, and the access point group #n **700-*n* may operate in a channel #k. The bandwidth of the channel may be 1.25 MHz, 2.5 MHz, 5 MHz, 10 MHz, 20 MHz, 40 MHz, 80 MHz, 160 MHz, or the like. Each of n, m, l, o, and k may be a positive integer. Each of the access points belonging to the access point groups 700-1, 700-2, . . . , and 700-*n* and the low-power stations 710 of FIG. 23 may be the same as the access point belonging to the access point groups 700-1, 700-2, . . . , and 700-*n* of FIG. 8 and the low-power station 710, and may be configured to be the same as the low-power station 500 of FIG. 5**.

The access point belonging to the access point group 700-1, 700-2, . . . , or **700-*n*** may generate a beacon frame and transmit the beacon frame in its operation channel. Information elements included in the beacon frame may be as follows.

FIG. 24 is a conceptual diagram illustrating a first embodiment of information elements included in a beacon frame in a WLAN-based communication system, FIG. 25 is a conceptual diagram illustrating a second embodiment of information elements included in a beacon frame in a WLAN-based communication system, and FIG. 26 is a conceptual diagram illustrating a third embodiment of information elements included in a beacon frame in a WLAN-based communication system.

Referring to FIGS. 24 to 26, a beacon frame may include at least one information element among information elements #1 to #58. For example, the beacon frame generated by the access point belonging to the access point group 700-1, 700-2, . . . , or 700-3 of FIG. 23 may include an information element indicating the WUR capability (e.g., information element #56), an information element indicating the WUR support channel (e.g., information element #57), and the like. The information element indicating the WUR capability may include the information (e.g., WUR band, duty cycle, QoS mode, WUR ACK, etc.) indicated by the WUR capability field 923 of FIG. 16. The information element indicating the WUR support channel may include the information (e.g., channel number, WUR channel number, WUR channel count, etc.) indicated by the WUR support channel field 924 of FIG. 17.

Referring again to FIG. 23, the low-power station 710 may perform a monitoring operation in the channel #1 in order to receive the beacon frame of the access points 700-1-1, 700-1-2, . . . , and **700-1-*m* belonging to the access point group #1 700-1. The access points 700-1-1, 700-1-2, . . . , and 700-1-*m* belonging to the access point group #1 700-1 may transmit the beacon frame in the channel #1 (S712-1). When a channel state between the low-power station 710 and the access points 700-1-1, 700-1-2, . . . , and 700-1-*m* belonging to the access point group #1 700-1 is bad, the low-power station 710 may not receive the beacon frame of the access points 700-1-1, 700-1-2, . . . , and 700-1-*m* belonging to the access point group #1 700-1. When the beacon frame of the access points 700-1-1, 700-1-2, . . . , and 700-1-*m* belonging to the access point group #1 700-1 is not received within a predetermined time, the low-power station 710 may move from the channel #1 to the channel #2 (e.g., channel #2 of FIG. 18). That is, the operation channel of the low-power station 710** may be changed from the channel #1 to the channel #2.

Alternatively, when the beacon frame of the access points 700-1-1, 700-1-2, . . . , and **700-1-*m* belonging to the access point group #1 700-1 is received in the channel #1, the low-power station 710 may identify the information elements (e.g., the information elements shown in FIGS. 24 to 26) included in the beacon frame of the access points 700-1-1, 700-1-2, . . . , and 700-1-*m* belonging to the access point group #1 700-1. Thereafter, the operation channel of the low-power station 710** may be changed from the channel #1 to the channel #2.

The low-power station 710 may perform a monitoring operation in the channel #2 in order to receive the beacon frame of the access points 700-2-1, 700-2-2, . . . , and 700-2-1 belonging to the access point group #2 700-2. The access points 700-2-1, 700-2-2, . . . , and 700-2-1 belonging to the access point group #2 700-2 may transmit the beacon frame in the channel #2 (S712-2), and the low-power station 710 may receive the beacon frame of the access points 700-2-1, 700-2-2, . . . , and 700-2-1 belonging to the access point group #2 700-2 in the channel #2. The low-power station 710 may identify the information elements (e.g., the information elements shown in FIGS. 24 to 26) included in the beacon frame of the access points 700-2-1, 700-2-2, . . . , and 700-2-1 belonging to the access point group #2 700-2.

The reception procedure of the beacon frame described above may be performed in the channels #1 to #k. For example, when a beacon frame is received or a beacon frame is not received within a predetermined time in the channel #(k−1), the low-power station 710 may move from the channel #(k−1) to the channel #k. That is, the operation channel of the low-power station 710 may be changed from the channel #(k−1) to the channel #k.

The low-power station 710 may perform a monitoring operation in the channel #k in order to receive the beacon frame of the access points **700-*n*-1, 700-*n*-2, . . . , and 700-*n*-o belonging to the access point group #n 700-*n*. The access points 700-*n*-1, 700-*n*-2, . . . , and 700-*n*-o belonging to the access point group #n 700-*n* may transmit the beacon frame in the channel #k (S712-3**), and the low-power station 710 may receive the beacon frame of the access points 700-*n*-1, 700-*n*-2, . . . , and 700-*n*-*o* belonging to the access point group #n 700-*n* in the channel #k. The low-power station 710 may identify the information elements (e.g., the information elements shown in FIGS. 24 to 26) included in the beacon frame of the access points 700-*n*-1, 700-*n*-2, . . . , and 700-*n*-*o* belonging to the access point group #n 700-*n*.

When the scanning step S710 of FIG. 7 is completed, the authentication step S720 may be performed. The low-power station 710 may perform the authentication step S720 with at least one access point detected in the scanning step S710 (e.g., at least one access point that transmitted the probe response frame or beacon frame received at the low-power station 710) (S720). The authentication step S720 may be performed as follows.

FIG. 27 is a sequence chart illustrating a first embodiment of an authentication step (S720) in a WLAN-based communication system.

Referring to FIG. 27, a communication system may include an access point 700, a low-power station 710, and the like. Each of the access point 700 and the low-power station 710 of FIG. 27 may be the same as the access point 700 and the low-power station 710 of FIG. 7, and may be configured to be the same as the low-power station 500 of FIG. 5.

The authentication algorithm according to the IEEE 802.11 standard may be classified into an open system algorithm for exchanging two authentication frames, a shared key algorithm for exchanging four authentication frames, and the like. The authentication step 720 between the access point 700 and the low-power station 710 may be performed based on the open system algorithm or the shared key algorithm.

After receiving the probe response frame or beacon frame of the access point 700 in the scanning step S710, the low-power station 710 may perform the authentication step S720 with the access point 700. For example, the low-power station 710 may generate an authentication request frame and may transmit the authentication request frame to the access point 700 (S721). The authentication request frame may include an authentication key, the information (e.g., WUR band, duty cycle, QoS mode, WUR ACK, etc.) indicated by the WUR capability field 923 of FIG. 16, the information (e.g., channel number, WUR channel number, WUR channel count, etc.) indicated by the WUR support channel field 924 of FIG. 17, and the like.

The access point 700 may receive the authentication request frame from the low-power station 710, and may identify the information included in the authentication request frame. The access point 700 may generate an authentication response frame in response to the authentication request frame, and may transmit the authentication response frame to the low-power station 700 (S722). The authentication response frame may include an authentication key, the information (e.g., WUR band, duty cycle, QoS mode, WUR ACK, etc.) indicated by the WUR capability field 923 of FIG. 16, the information (e.g., channel number, WUR channel number, WUR channel count, etc.) indicated by the WUR support channel field 924 of FIG. 17, and the like. The low-power station 710 may receive the authentication response frame from the access point 700, and may identify the information included in the authentication response frame. When the exchange of the authentication request/response frames between the access point 700 and the low-power station 710 is completed, the authentication step 720 may be terminated.

When the authentication step S720 of FIG. 7 is completed, the association step S730 may be performed. The low-power station 710 may perform the association step S730 with at least one access point that has been authenticated (e.g., at least one access point that has performed the authentication step S720 with the low-power station 710). The association step S730 may be performed as follows.

FIG. 28 is a sequence chart illustrating a first embodiment of an association step (S730) in a WLAN-based communication system.

Referring to FIG. 28, a communication system may include an access point 700, a low-power station 710, and the like. Each of the access point 700 and the low-power station 710 of FIG. 28 may be the same as the access point 700 and the low-power station 710 of FIG. 7, and may be configured to be the same as the low-power station 500 of FIG. 5. The low-power station 710 may generate an association request frame. Information elements included in the frame body of the association request frame may be as follows.

FIG. 29 is a conceptual diagram illustrating a first embodiment of information elements included in an association request frame in a WLAN-based communication system.

Referring to FIG. 29, the association request frame may include at least one information element among information elements #1 to #21. For example, the association request frame generated by the low-power station 710 of FIG. 28 may include an information element indicating the WUR capability (e.g., information element #19), an information element indicating the WUR support channel (e.g., information element #20), and the like. The information element indicating the WUR capability may include the information (e.g., WUR band, duty cycle, QoS mode, WUR ACK, etc.) indicated by the WUR capability field 923 of FIG. 16. The information element indicating the WUR support channel may include the information (e.g., channel number, WUR channel number, WUR channel count, etc.) indicated by the WUR support channel field 924 of FIG. 17.

Referring again to FIG. 28, the low-power station 710 may transmit the association request frame to the access point 700 (S731). The access point 700 may receive the association request frame from the low-power station 710, and may identify the information elements included in the association request frame. Also, the access point 700 may transmit an ACK frame for the association request frame to the low-power station 710 (S732). When the ACK frame is received from the access point 700, the low-power station 710 may determine that the association request frame is successfully received at the access point 700.

The access point 700 may generate an association response frame in response to the association request frame. Information elements included in the frame body of the association response frame may be as follows.

FIG. 30 is a conceptual diagram illustrating a first embodiment of information elements included in an association response frame in a WLAN-based communication system.

Referring to FIG. 30, the association response frame may include at least one information element among information elements #1 to #24. For example, the association response frame generated by the access point 700 of FIG. 28 may include an information element indicating the WUR capability (e.g., information element #22), an information element indicating the WUR support channel (e.g., information element #23), and the like. The information element indicating the WUR capability may include the information (e.g., WUR band, duty cycle, QoS mode, WUR ACK, etc.) indicated by the WUR capability field 923 of FIG. 16. The information element indicating the WUR support channel may include the information (e.g., channel number, WUR channel number, WUR channel count, etc.) indicated by the WUR support channel field 924 of FIG. 17.

Referring again to FIG. 28, the access point 700 may transmit the association response frame to the low-power station 710 (S733). The low-power station 710 may receive the association response frame from the access point 700, and may identify the information included in the association response frame. Also, the low-power station 710 may transmit an ACK frame for the association response frame to the access point 700 (S734). When the ACK frame is received from the low-power station 710, the access point 700 may determine that the association response frame is successfully received at the low-power station 710.

When the exchange of the association request/response frames described above is completed, the association step S730 may be terminated. The reassociation step of the access point 700 and the low-power station 710 may be performed in the same or similar manner as the association step S730. For example, the low-power station 710 may generate a reassociation request frame and may transmit the reassociation request frame to the access point 700. The access point 700 may receive the reassociation request frame from the low-power station 710, and may identify the information included in the reassociation request frame. Also, the access point 700 may transmit an ACK frame for the reassociation request frame to the low-power station 710. When the ACK frame is received from the access point 700, the low-power station 710 may determine that the reassociation request frame is successfully received at the access point 700.

The access point 700 may generate a reassociation response frame in response to the reassociation request frame, and transmit the reassociation response message to the low-power station 710. The low-power station 710 may receive the reassociation response frame from the access point 700, and may identify the information included in the reassociation response frame. Also, the low-power station 710 may transmit an ACK frame for the reassociation response frame to the access point 700. When the ACK frame is received from the low-power station 710, the access point 700 may determine that the reassociation response frame is successfully received at the low-power station 710.

Here, information elements included in the frame body of the reassociation request frame may be as follows.

FIG. 31 is a conceptual diagram illustrating a first embodiment of information elements included in a reassociation request frame in a WLAN-based communication system.

Referring to FIG. 31, the reassociation response frame may include at least one information element among information elements #1 to #26. For example, the reassociation response frame generated by the low-power station 710 may include an information element indicating the WUR capability (e.g., information element #24), an information element indicating the WUR support channel (e.g., information element #25), and the like. The information element indicating the WUR capability may include the information (e.g., WUR band, duty cycle, QoS mode, WUR ACK, etc.) indicated by the WUR capability field 923 of FIG. 16. The information element indicating the WUR support channel may include the information (e.g., channel number, WUR channel number, WUR channel count, etc.) indicated by the WUR support channel field 924 of FIG. 17.

Meanwhile, information elements included in the frame body of the reassociation response frame may be as follows.

FIG. 32 is a conceptual diagram illustrating a first embodiment of information elements included in a reassociation response frame in a WLAN-based communication system, and FIG. 33 is a conceptual diagram illustrating a second embodiment of information elements included in a reassociation response frame in a WLAN-based communication system.

Referring to FIGS. 32 and 33, the reassociation response frame may include at least one information element among information elements #1 to #28. For example, the reassociation response frame generated by the access point 700 may include an information element indicating the WUR capability (e.g., information element #26), an information element indicating the WUR support channel (e.g., information element #27), and the like. The information element indicating the WUR capability may include the information (e.g., WUR band, duty cycle, QoS mode, WUR ACK, etc.) indicated by the WUR capability field 923 of FIG. 16. The information element indicating the WUR support channel may include the information (e.g., channel number, WUR channel number, WUR channel count, etc.) indicated by the WUR support channel field 924 of FIG. 17.

Meanwhile, when the association step S730 of FIG. 7 is completed, the low-power station 710 may perform communications (e.g., a transmission/reception procedure of a data frame) with the access point 700 by using the PCR. Also, after the association step S730 is completed, the low-power station 710 may perform the WUR association step S740 with the access point 700 to operate in the WUR mode. For example, the low-power station 710 may operate only in the normal mode before the completion of the WUR association step S740, and may operate in the normal mode or the WUR mode after the completion of the WUR association step S740.

The WUR association step S740 may be initiated by a request of the low-power station 710 or the access point 700. The WUR association step S740 initiated by the low-power station 710 may be performed as follows.

FIG. 34 is a sequence chart illustrating a first embodiment of a WUR association step S740 in a WLAN-based communication system.

Referring to FIG. 34, a communication system may include an access point 700, a low-power station 710, and the like. Each of the access point 700 and the low-power station 710 in FIG. 34 may be the same as the access point 700 and the low-power station 710 in FIG. 7, and may be configured to be the same as the low-power station 500 in FIG. 5. The low-power station 710 may generate a WUR association request frame. The WUR association request frame may be an action frame. When the action frame belongs to the management frame, a MAC frame of the WUR association request frame may be the same as or similar to the MAC frame 900 shown in FIG. 9. Information elements included in the frame body of the WUR association request frame may be as follows.

FIG. 35 is a conceptual diagram illustrating a first embodiment of information elements included in a WUR association request frame.

Referring to FIG. 35, the information element included in the WUR association request frame may be at least one of 'action', 'vendor-specific element', and 'MME'. The information element indicating 'action' may be set to an action field in the WUR association request frame. The action field of the WUR association request frame may be as follows.

FIG. 36 is a conceptual diagram illustrating a first embodiment of an action field of a WUR association request frame.

Referring to FIG. 36, the action field 3600 of the WUR association request frame may include a category field 3610 and an action detail field 3620. The size of the category field 3610 may be 1 octet, and the size of the action detail field 3620 may be variously configured. A code indicated by the category field 3610 of the action field 3600 may be as follows.

FIG. 37 is a conceptual diagram illustrating a first embodiment of codes indicated by a category field of an action field.

Referring to FIG. 37, the category field 3610 of the action field 3600 may be set to one of codes #1 to #255. The category field of the action field in the frame (e.g., WUR association request frame and WUR association response frame) used in the WUR association step S740 may be set to the code #18. Therefore, when it is determined that the category field of the action field is set to the code #18, the communication node (e.g., access point, station, low-power station, etc.) may determine that the corresponding frame is used in the WUR association step S740.

Meanwhile, information elements included in the action field 3600 of the WUR association request frame may be as follows.

FIG. 38 is a conceptual diagram illustrating a first embodiment of information elements included in an action field of a WUR association request frame.

Referring to FIG. 38, the action field of the WUR association request frame may include at least one of information elements #1 to #4. The category indicated by the information element #1 may be included in the category field 3610 of FIG. 36. A WUR action indicated by the information element #2, a dialog token indicated by the information element #3, and a WUR parameter set indicated by the information element #4 may be included in the action detail field 3620 of FIG. 36. The value of the WUR action (e.g., WUR action field) indicated by the information element #2 may be set as follows.

FIG. 39 is a conceptual diagram illustrating a first embodiment of a WUR action field included in an action detail field.

Referring to FIG. 39, the WUR action field set to '0' may indicate that the corresponding action frame is the WUR association request frame, the WUR action field set to '1' may indicate that the corresponding action frame is the WUR association response frame, and the WUR action field set to '2' may indicate that the corresponding action frame is a WUR disassociation frame. In this case, the WUR action field of the WUR association request frame generated by the low-power station 710 in FIG. 34 may be set to '0'.

Meanwhile, the WUR parameter set indicated by the information element #4 in FIG. 38 may be as follows.

FIG. 40 is a conceptual diagram illustrating a first embodiment of a WUR parameter set included in an action detail field.

Referring to FIG. 40, a WUR parameter set 4000 may include a WUR mode field 4010, a WUR operation channel field 4020, a duty cycle parameter set field 4030, a WUR ACK policy field 4040, a wake-up latency field 4050, and a reserved field 4060. The WUR mode field 4010 may indicate the operation mode of the low-power station 710. For example, the WUR mode field 4010 set to '0' may indicate that the low-power station 710 operates in the normal mode or the WUR mode based on the duty cycle scheme. The WUR mode field 4010 set to '1' may indicate that the low-power station 710 (e.g., the WUR of the low-power station 710) operates in the normal mode or the WUR mode without the use of the duty cycle scheme.

The WUR operation channel field 4020 may indicate a channel (e.g., a WUR channel) in which the WUR of the low-power station 710 operates. For example, the WUR operation channel field 4020 may indicate the WUR channel number in FIG. 18. The duty cycle parameter set field 4030 may include a period field 4031 and a duration field 4032. The period field 4031 may indicate a period in which the low-power station 710 operates in the WUR mode, and the duration field 4032 may indicate a time during which the low-power station 710 operates in the WUR mode. For example, the low-power station 710 may operate in the WUR mode in a time domain indicated by the period field 4031 and the duration field 4032, and may operate in the normal mode in the time domain other than the time domain indicated by the period field 4031 and the duration field 4032.

The WUR ACK policy field 4040 may indicate an ACK scheme for the WUR frame (e.g., the WUR frame in FIG. 6). For example, the WUR ACK policy field 4040 may indicate a 'no-ACK' scheme, an 'immediate' ACK scheme, or a 'delayed' ACK scheme. The wake-up latency field 4050 may indicate a time (hereinafter referred to as a 'transition time') required for the operation state of the PCR of the low-power station 710 to transition from the sleep state to the wake-up state. The communication node that transmitted the WUR frame may estimate a reception time of the ACK frame for the WUR frame by using the transition time indicated by the wake-up latency field 4050, and set a timer for retransmission of the WUR frame.

Referring again to FIG. 34, the low-power station 710 may transmit the WUR association request frame to the access point 700 (S741-1). The category field of the action field of the WUR association request frame may be set to the code #18 of FIG. 37, the WUR action field of the action field of the WUR association request frame may be set to '0' of FIG. 39, and the WUR parameter set of the action field of the WUR association request frame may be configured to be the same as the WUR parameter set 4000 of FIG. 40.

The access point 700 may receive the WUR association request frame from the low-power station 710, and transmit an ACK frame for the WUR association request frame to the low-power station 710 (S741-2). When the ACK frame is received from the access point 700, the low-power station 710 may determine that the WUR association request frame is successfully received at the access point 700.

When the WUR association request frame is received, the access point 700 may identify the information included in the WUR association request frame, and determine whether to approve the WUR association requested by the WUR association request frame. When the WUR association between the access point 700 and the low-power station 710 is not approved, the access point 700 may transmit a WUR association reject frame (not shown) indicating a rejection of the WUR association to the low-power station 710. When the WUR association reject frame is received from the access point 700, the low-power station 710 may determine that the requested WUR association is not approved. In this case, the low-power station 710 may operate only in the normal mode.

On the other hand, when the WUR association between the access point 700 and the low-power station 710 is approved, the access point 700 may change the information (e.g., WUR mode, WUR operation channel, duty cycle parameter set, WUR ACK policy, wake-up latency, etc.)

indicated by the WUR parameter set included in the WUR association request frame according to a necessity. The access point 700 may generate a WUR association response frame in response to the WUR association request frame.

A MAC frame of the WUR association response frame may be the same as or similar to the MAC frame 900 shown in FIG. 9. The frame body of the WUR association response frame may include the information elements of FIG. 35, and the action field of the WUR association response frame may be set to be the same as the action field 3600 of FIG. 36. For example, information elements included in the action field 3600 of the WUR association response frame may be as follows.

FIG. 41 is a conceptual diagram illustrating a first embodiment of information elements included in an action field of a WUR association response frame.

Referring to FIG. 41, the action field of the WUR association response frame may include at least one of information elements #1 to #5. The category indicated by the information element #1 may be included in the category field 3610 of FIG. 36, and the category field 3610 of the action field 3600 of the WUR association response frame may be set to the code #18 of FIG. 37. The WUR action indicated by the information element #2, the dialog token indicated by the information element #3, the status code indicated by the information element #4, and the WUR parameter set indicated by the information element #5 may be included in the action detail field 3620 of FIG. 36. The value of the WUR action (e.g., WUR action field) indicated by the information element #2 may be set based on the values of FIG. 39. For example, the value of the WUR action in the WUR association response frame may be set to '1'. Meanwhile, the status code of the WUR association response frame may be set as follows.

FIG. 42 is a conceptual diagram illustrating a first embodiment of status codes of a WUR association response frame, FIG. 43 is a conceptual diagram illustrating a second embodiment of status codes of a WUR association response frame, FIG. 44 is a conceptual diagram illustrating a third embodiment of status codes of a WUR association response frame, FIG. 45 is a conceptual diagram illustrating a fourth embodiment of status codes of a WUR association response frame, FIG. 46 is a conceptual diagram illustrating a fifth embodiment of status codes of a WUR association response frame, and FIG. 47 is a conceptual diagram illustrating a sixth embodiment of status codes of a WUR association response frame.

Referring to FIGS. 42 to 47, the status code of the WUR association response frame may be set to at least one of #0 to #65535.

Referring again to FIG. 34, the WUR parameter set in the WUR association response frame may be the same as the WUR parameter set 4000 in FIG. 40. When the WUR parameter set included in the WUR association request frame is changed by the access point 700, the WUR parameter set of the WUR association response frame may be set to the changed WUR parameter set. On the other hand, when the WUR parameter set included in the WUR association request frame is not changed by the access point 700, the WUR parameter set of the WUR association response frame may be set to the WUR parameter set included in the WUR association request frame.

The access point 700 may transmit the WUR association response frame to the low-power station 710 (S741-3). The low-power station 710 may receive the WUR association response frame from the access point 700, and may transmit an ACK frame for the WUR association response frame to the access point 700 (S741-4). When the ACK frame is received from the low-power station 700, the access point 700 may determine that the WUR association response frame is successfully received at the low-power station 700.

The low-power station 710 may identify the information included in the WUR association response frame, and may perform communications based on the identified information. For example, the WUR of the low-power station 710 may perform communications in the WUR channel indicated by the WUR parameter set included in the WUR association response frame, and operate in the normal mode or the WUR mode based on the WUR mode and the duty cycle parameter set indicated by the WUR parameter set included in the WUR association response frame. Also, the low-power station 710 may transmit an ACK frame based on the WUR ACK policy indicated by the WUR parameter set included in the WUR association response frame.

Meanwhile, the WUR association step S740 initiated by the access point 700 may be performed as follows.

FIG. 48 is a sequence chart illustrating a second embodiment of a WUR association step S740 in a WLAN-based communication system.

Referring to FIG. 48, a communication system may include an access point 700, a low-power station 710, and the like. Each of the access point 700 and the low-power station 710 of FIG. 48 may be the same as the access point 700 and the low-power station 710 of FIG. 7, and may be configured to be the same as the low-power station 500 of FIG. 5.

The access point 700 may generate a WUR association request frame. The WUR association request frame may be configured to be the same as or similar to the WUR association request frame of FIG. 34. For example, a MAC frame of the WUR association request frame may be the same as the MAC frame 900 shown in FIG. 9. The frame body of the WUR association request frame may include the information elements of FIG. 35, and the action field of the WUR association request frame may be configured to be the same as the action field 3600 of FIG. 36.

The action field 3600 of the WUR association request frame may include the information elements of FIG. 38, the 'category' among the information elements of FIG. 38 may be set to a value indicating the WUR (e.g., the code #18 of FIG. 37), the 'WUR action' among the information elements of FIG. 38 may be set to a value indicating the WUR association request frame (e.g., '0' of FIG. 39), and the 'WUR parameter set' among the information elements of FIG. 38 may be configured to be the same as or similar to the WUR parameter set 4000 of FIG. 40. For example, the WUR association request frame may include the information (e.g., WUR mode, WUR operation channel, duty cycle parameter set, WUR ACK policy, wake-up latency, etc.) indicated by the WUR parameter set 4000 of FIG. 40.

The access point 700 may transmit the WUR association request frame from the low-power station 710 (S742-1). The low-power station 710 may receive the WUR association request frame from the access point, and transmit an ACK frame to the access point 700 in response to the WUR association request frame (S741-2). When the ACK frame is received from the low-power station 710, the access point 700 may determine that the WUR association request frame is successfully received at the low-power station 710.

When the WUR association request frame is received, the low-power station 710 may identify the information included in the WUR association request frame, and determine whether to approve the WUR association requested by the WUR association request frame. When the WUR association between the access point 700 and the low-power station 710 is not approved, the low-power station 710 may transmit a WUR association reject frame (not shown) indicating a rejection of the WUR association to the access point 700. When the WUR association reject frame is received from the low-power station 710, the access point 700 may determine that the WUR association is not approved. In this case, the access point 700 may not support the low-power station 710 operating in the WUR mode. When the WUR association step S740 is initiated by the access point 700, the step of determining whether to approve the WUR association may be omitted.

When the WUR association request frame is received from the access point 700 or when the WUR association between the access point 700 and the low-power station 710 is approved, the low-power station 710 may change the information (e.g., WUR mode, WUR operation channel, duty cycle parameter set, WUR ACK policy, wake-up latency, etc.) indicated by the WUR parameter set included in the WUR association request frame according to a necessity.

The low-power station 710 may generate a WUR association response frame in response to the WUR association request frame. The WUR association response frame may be configured to be the same as or similar to the WUR association response frame of FIG. 34. For example, a MAC frame of the WUR association response frame may be the same as or similar to the MAC frame 900 shown in FIG. 9. The frame body of the WUR association response frame may include the information elements of FIG. 35, and the action field of the WUR association response frame may be configured to be the same as the action field 3600 of FIG. 36.

The action field 3600 of the WUR association response frame may include the information elements of FIG. 41, the 'category' among the information elements of FIG. 41 may be set to a value indicating the WUR (e.g., the code #18 of FIG. 37), the 'WUR action' among the information elements of FIG. 41 may be set to a value indicating the WUR association response frame (e.g., '1' of FIG. 39), the 'status code' among the information elements of FIG. 41 may be set based on FIGS. 42 to 47, the 'WUR parameter set' among the information elements of FIG. 41 may be configured to be the same as or similar to the WUR parameter set 4000 of FIG. 40. For example, the WUR association response frame may include the WUR parameter set changed by the low-power station 710 or the WUR parameter set included in the WUR association request frame.

The low-power station 710 may transmit the WUR association response frame to the access point 700 (S742-3). The access point 700 may receive the WUR association response frame from the low-power station 710, and may transmit an ACK frame for the WUR association response frame to the low-power station 710 (S742-4). When the ACK frame is received from the access point 700, the low-power station 710 may determine that the WUR association response frame is successfully received at the access point 700.

The access point 700 may identify the information included in the WUR association response frame, and support the operation (e.g., normal mode or WUR mode) of the low-power station 710 based on the identified information. After receiving the ACK frame for the WUR association response frame, the low-power station 710 may perform communications based on the information included in the WUR association response frame. For example, the WUR of the low-power station 710 may perform communications in the WUR channel indicated by the WUR parameter set included in the WUR association response frame, and the low-power station 710 may operate in the normal mode or the WUR mode based on the WUR mode and duty cycle parameter set indicated by the WUR parameter set included in the WUR association response frame. Also, the low-power station 710 may transmit an ACK frame based on the WUR ACK policy indicated by the WUR parameter set included in the WUR association response frame.

Meanwhile, when the WUR association step S740 of FIG. 7 is completed, communications between the access point 700 and the low-power station 710 may be performed. In this case, the access point 700 may support the low-power station 710 operating in the normal mode or the WUR mode, and the low-power station 710 may operate in the normal mode or the WUR mode to communicate with the access point 700.

The WUR association between access point 700 and the low-power station 710 may be released according to a request of the low-power station 710 or the access point 700. For example, the low-power station 710 may request release of the WUR association to the access point 700 when the low-power station 710 does not need to operate in the WUR mode. Alternatively, the access point 700 may request release of the WUR association to the low-power station 710 when the access point 700 does not support the low-power station 710 operating in the WUR mode.

The WUR disassociation step initiated by the low-power station 710 may be performed as follows.

FIG. 49 is a sequence chart illustrating a first embodiment of a WUR disassociation step in a WLAN-based communication system.

Referring to FIG. 49, a communication system may include an access point 700, a low-power station 710, and the like. Each of the access point 700 and the low-power station 710 of FIG. 49 may be the same as the access point 700 and the low-power station 710 of FIG. 7, and may be configured to be the same as the low-power station 500 of FIG. 5. The low-power station 710 may generate a WUR disassociation frame. The WUR disassociation frame may be an action frame. When the action frame belongs to the management frame, a MAC frame of the WUR disassociation frame may be the same as the MAC frame 900 shown in FIG. 9.

The frame body of the WUR disassociation frame may include the information elements of FIG. 35, the action field of the WUR disassociation frame may be configured to be the same as the action field 3600 of FIG. 36, and the information elements included in the action field of the WUR disassociation frame may be as follows.

FIG. 50 is a conceptual diagram illustrating a first embodiment of information elements included in an action field of a WUR disassociation frame.

Referring to FIG. 50, the action field of the WUR disassociation frame may include at least one of information elements #1 to #3. The category indicated by the information element #1 may be included in the category field 3610 of FIG. 36. The WUR action indicated by the information element #2 and the reason code indicated by the information element #3 may be included in the action detail field 3620 of FIG. 36. The value of the WUR action (e.g., WUR action field) indicated by the information element #2 may be set to a value indicating the WUR disassociation frame (e.g., '2' of FIG. 39). The reason code indicated by the information element #3 may be set as follows.

FIG. 51 is a conceptual diagram illustrating a first embodiment of reason codes of a WUR disassociation frame, FIG. 52 is a conceptual diagram illustrating a second embodiment of reason codes of a WUR disassociation frame, FIG. 53 is a conceptual diagram illustrating a third embodiment of reason codes of a WUR disassociation frame, FIG. 54 is a conceptual diagram illustrating a fourth embodiment of reason codes of a WUR disassociation frame.

Referring to FIGS. 51 to 54, the reason code of the WUR disassociation frame may be set to at least one of #0 to #65535.

Referring again to FIG. 49, the low-power station 710 may transmit the WUR disassociation frame to the access point 700 (S4910). When the WUR disassociation frame is received from the low-power station 710, the access point 700 may determine that the WUR association between the access point 700 and the low-power station 710 is requested to be released. Accordingly, the access point 700 may release the WUR association with the low-power station 710. In this case, the access point 700 may not support the low-power station 710 operating in the WUR mode.

The access point 700 may generate an ACK frame in response to the WUR disassociation frame, and may transmit the ACK frame to the low-power station 710 (S4920). When the ACK frame is received from the access point 700, the low-power station 710 may determine that the WUR disassociation frame is successfully received at the access point 700, and release the WUR association with the access point 700.

Even when the WUR disassociation step is completed, the association between the access point 700 and the low-power station 710 established by the association step S730 of FIG. 7 may be maintained. Thus, communications between the access point 700 and the low-power station 710 may be performed. Here, the low-power station 710 may only operate in the normal mode.

Meanwhile, the WUR disassociation step initiated by the access point 700 may be performed as follows.

FIG. 55 is a sequence chart illustrating a second embodiment of a WUR disassociation step in a WLAN-based communication system.

Referring to FIG. 55, a communication system may include an access point 700, a low-power station 710, and the like. Each of the access point 700 and the low-power station 710 of FIG. 55 may be the same as the access point 700 and the low-power station 710 of FIG. 7, and may be configured to be the same as the low-power station 500 of FIG. 5. The access point 700 may generate a WUR disassociation frame. The disassociation frame of FIG. 55 may be configured to be the same as or similar to the disassociation frame of FIG. 49.

For example, the WUR disassociation frame may be an action frame. When the action frame belongs to the management frame, a MAC frame of the WUR association release frame may be the same as the MAC frame 900 shown in FIG. 9. The frame body of the WUR disassociation frame may include the information elements of FIG. 35, the action field of the WUR disassociation frame may be configured to be the same as the action field 3600 of FIG. 36, and the action field of the WUR disassociation frame may include the information elements #1 to #3 of FIG. 50.

The value of the WUR action (e.g., WUR action field) indicated by the information element #2 included in the action field 3600 of the WUR disassociation frame may be set to a value indicating the WUR disassociation frame (e.g., '2' of FIG. 39). The information element #3 included in the action field 3600 of the WUR disassociation frame may be set to at least one of the reason codes #0 to #65535 of FIGS. 51 to 54.

The access point 700 may transmit the WUR disassociation frame to the low-power station 710 (S5510). When the WUR disassociation frame is received from the access point 700, the low-power station 710 may determine that the WUR disassociation between the access point 700 and the low-power station 710 is requested. Accordingly, the low-power station 710 may release the WUR association with the access point 700.

The low-power station 710 may generate an ACK frame in response to the WUR disassociation frame, and may transmit the ACK frame to the access point 700 (S5520). When the ACK frame is received from the low-power station 710, the access point 700 may determine that the WUR disassociation frame is successfully received at the low-power station 710, and release the WUR association with the low-power station 710. In this case, the access point 700 may not support the low-power station 710 operating in the WUR mode.

Even when the WUR disassociation step is completed, the association between the access point 700 and the low-power station 710 established by the association step S730 of FIG. 7 may be maintained. Thus, communications between the access point 700 and the low-power station 710 may be performed. Here, the low-power station 710 may only operate in the normal mode.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a station in a communication system, the operation method comprises:
   generating, by the station including a primary communication radio (PCR) and a wake-up radio receiver (WURx), a probe request frame including wake-up radio (WUR) capability information for the station supporting a WUR mode;
   transmitting, by the station, the probe request frame;
   receiving, by the station, a probe response frame from an access point which has received the probe request frame;
   performing, by the station, an authentication procedure with the access point;
   performing, by the station, an association procedure with the access point which has performed the authentication procedure;

performing, by the station, a procedure for configuring the WUR mode with the access point associated with the stations;
after performing the procedure for configuring the WUR mode, operating in the WUR mode instead of a normal mode; and
performing, by the station, a procedure for releasing the WUR mode with the access point associated with the station,
wherein, in the normal mode, the PCR included in the station operates in a wake-up state and the WURx included in the station operates in a sleep state,
wherein, in the WUR mode, the PCR included in the station operates in the sleep state, the WURx included in the station operates in the wake-up state within on-duration in a period of a WUR duty cycle, and the WURx included in the station operates in the sleep state within off-duration except for the on-duration in the period of the WUR duty cycle, and
wherein, even when the WUR mode is released, association between the station and the access point is maintained.

2. The operation method according to claim 1, wherein the probe response frame includes first information indicating a channel used for WUR operations.

3. The operation method according to claim 1, wherein the WUR capability information includes second information indicating a time necessary for the station to transit from the sleep state to the wake-up state.

4. The operation method according to claim 1, wherein the probe response frame includes third information indicating the period of the WUR duty cycle.

5. The operation method according to claim 4, wherein the probe response frame further includes fourth information indicating the on-duration in the period of the WUR duty cycle.

6. The operation method according to claim 1, wherein, in the procedure for configuring the WUR mode, the WUR capability information is exchanged between the station and the access point.

7. An operation method of an access point in a communication system, the operation method comprises:
receiving, by the access point, a probe request frame from a station including a primary communication radio (PCR) and a wake-up radio receiver (WURx);
generating, by the access point, a probe response frame including wake-up radio (WUR) capability information for a WUR mode;
transmitting, by the access point, the probe response frame in response to the probe request frame to the station;
performing, by the access point, an authentication procedure with the station;
performing, by the access point, an association procedure with the station which has performed the authentication procedure;
performing, by the access point, a procedure for configuring the WUR mode with the station associated with the access point;
after performing the procedure for configuring the WUR mode, supporting the WUR mode of the station; and
performing, by the access point, a procedure for releasing the WUR mode with the station associated with the access point,
wherein, in a normal mode, the PCR included in the station operates in a wake-up state and the WURx included in the station operates in a sleep state,
wherein, in the WUR mode, the PCR included in the station operates in the sleep state, the WURx included in the station operates in the wake-up state within on-duration in a period of a WUR duty cycle, and the WURx included in the station operates in the sleep state within off-duration except for the on-duration in the period of the WUR duty cycle, and
wherein, even when the WUR mode is released, association between the station and the access point is maintained.

8. The operation method according to claim 7, wherein the probe response frame includes first information indicating a channel used for WUR operations, and the WUR capability information includes second information indicating a time necessary for the station to transit from the sleep state to the wake-up state.

9. The operation method according to claim 7, wherein the probe response frame includes at least one of third information indicating the period of the WUR duty cycle and fourth information indicating the on-duration in the period of the WUR duty cycle.

10. A station in a communication system, the station comprises:
a processor;
a memory storing one or more commands executed by the processor; and
a primary communication radio (PCR) performing transmission and reception operations according to the one or more commands; and
a wake-up radio receiver (WURx) performing a reception operation according to the one or more commands,
wherein the one or more commands are executed to transmit a probe request frame, receive a probe response frame from an access point which has received the probe request frame, identify wake-up radio (WUR) capability information for the station supporting a WUR mode included in the probe response frame, perform an authentication procedure with the access point, perform an association procedure with the access point which has performed the authentication procedure, perform a procedure for configuring the WUR mode with the access point associated with the station, operate in the WUR mode instead of a normal mode after performing the procedure for configuring the WUR mode, and perform a procedure for releasing the WUR mode with the access point associated with the station,
wherein, in the normal mode, the PCR included in the station operates in a wake-up state and the WURx included in the station operates in a sleep state,
wherein, in the WUR mode, the PCR included in the station operates in the sleep state, the WURx included in the station operates in the wake-up state within on-duration in a period of a WUR duty cycle, and the WURx included in the station operates in the sleep state within off-duration except for the on-duration in the period of the WUR duty cycle, and
wherein, even when the WUR mode is released, association between the station and the access point is maintained.

11. The station according to claim 10, wherein the probe response frame information includes first information indicating a channel used for WUR operations, and WUR capability information includes second information indicating a time necessary for the station to transit from the sleep state to the wake-up state.

* * * * *